United States Patent
Cumana Morales et al.

(10) Patent No.: US 10,735,838 B2
(45) Date of Patent: Aug. 4, 2020

(54) TRANSPARENT WIRELESS BRIDGES FOR OPTICAL FIBER-WIRELESS NETWORKS AND RELATED METHODS AND SYSTEMS

(71) Applicant: Corning Optical Communications LLC, Hickory, NC (US)

(72) Inventors: Jesus Anzoategui Cumana Morales, Berlin (DE); Colin Brendan Daly, San Bruno, CA (US); Jeevan Kumar Vemagiri, Peoria, AZ (US); Yuval Zinger, Painted Post, NY (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 109 days.

(21) Appl. No.: 15/797,477

(22) Filed: Oct. 30, 2017

(65) Prior Publication Data
US 2018/0139521 A1 May 17, 2018

Related U.S. Application Data

(60) Provisional application No. 62/421,490, filed on Nov. 14, 2016.

(51) Int. Cl.
*H04Q 11/00* (2006.01)
*H04L 12/46* (2006.01)
(Continued)

(52) U.S. Cl.
CPC ....... *H04Q 11/0067* (2013.01); *H04B 10/272* (2013.01); *H04L 12/46* (2013.01);
(Continued)

(58) Field of Classification Search
None
See application file for complete search history.

(56) References Cited

U.S. PATENT DOCUMENTS

| 4,941,207 A | 7/1990 | Maeda et al. |
|---|---|---|
| 5,214,395 A | 5/1993 | Yun |

(Continued)

FOREIGN PATENT DOCUMENTS

| AU | 2003203591 A1 | 3/2004 |
|---|---|---|
| CN | 101095971 A | 1/2008 |

(Continued)

OTHER PUBLICATIONS

Author Unknown, "Fiber Optic Distributed Antenna System," Installation and Users Guide, ERAU Version 1.5, May 2002, Andrews Corporation, 53 pages.

(Continued)

*Primary Examiner* — Gregory B Sefcheck
*Assistant Examiner* — Suk Jin Kang
(74) *Attorney, Agent, or Firm* — William D. Doyle

(57) ABSTRACT

A transparent wireless bridge for providing access to an optical fiber network comprises a first transceiver outside a building and configured to transmit/receive communication signals to and from the optical fiber network. A first glass sheet attached to an outer side of a window comprises a first antenna communicatively coupled to the first transceiver and configured to transmit and receive communication signals to and from the first transceiver. A second glass sheet is attached to an inner side of the window and comprises a second antenna configured to wirelessly transmit and receive communication signals to and from the first antenna. The wireless bridge also includes a second transceiver located inside the building that is communicatively coupled to the second antenna and configured to wirelessly transmit and receive data to and from the second antenna. The wireless bridge may also be used in conjunction with a wireless drop system.

14 Claims, 20 Drawing Sheets

(51) Int. Cl.
*H04B 10/272* (2013.01)
*H04B 10/2575* (2013.01)
*H04W 84/12* (2009.01)

(52) U.S. Cl.
CPC ..... *H04Q 11/0071* (2013.01); *H04B 10/2575* (2013.01); *H04Q 2011/0088* (2013.01); *H04W 84/12* (2013.01)

(56) References Cited

U.S. PATENT DOCUMENTS

| | | |
|---|---|---|
| 5,751,789 A | 5/1998 | Farris et al. |
| 5,790,631 A | 8/1998 | Minarczik et al. |
| 5,835,128 A | 11/1998 | Macdonald et al. |
| 5,877,565 A | 3/1999 | Hollenbach et al. |
| 5,930,704 A | 7/1999 | Kay |
| 5,969,837 A | 10/1999 | Farber et al. |
| 5,994,998 A | 11/1999 | Fisher et al. |
| 6,049,593 A | 4/2000 | Acampora |
| 6,181,954 B1 | 1/2001 | Monroe et al. |
| 6,205,185 B1 | 3/2001 | Kajiwara |
| 6,314,163 B1 | 11/2001 | Acampora |
| 6,486,907 B1 | 11/2002 | Farber et al. |
| 6,493,875 B1 | 12/2002 | Eames et al. |
| 6,560,334 B1 | 5/2003 | Mullaney et al. |
| 6,647,015 B2 | 11/2003 | Malkemes et al. |
| 6,741,781 B2 | 5/2004 | Furuyama |
| 6,831,921 B2 | 12/2004 | Higgins |
| 6,871,081 B1 | 3/2005 | Llewellyn et al. |
| 6,882,801 B2 | 4/2005 | Imajo |
| 6,885,845 B1 | 4/2005 | Crowley et al. |
| 6,895,185 B1 | 5/2005 | Chung et al. |
| 6,978,474 B1 | 12/2005 | Sheppard et al. |
| 7,006,847 B2 | 2/2006 | Sato et al. |
| 7,027,431 B1 | 4/2006 | Thompson |
| 7,072,586 B2 | 7/2006 | Aburakawa et al. |
| 7,135,956 B2 | 11/2006 | Bartone et al. |
| 7,136,426 B2 | 11/2006 | Okada et al. |
| 7,146,180 B1 | 12/2006 | Liu |
| 7,181,142 B1 | 2/2007 | Xu et al. |
| 7,302,224 B2 | 11/2007 | Sibley et al. |
| 7,366,150 B2 | 4/2008 | Lee et al. |
| 7,369,838 B1 | 5/2008 | Murray et al. |
| 7,379,669 B2 | 5/2008 | Kim |
| 7,409,159 B2 | 8/2008 | Izadpanah |
| 7,450,854 B2 | 11/2008 | Lee et al. |
| 7,565,080 B2 | 7/2009 | Mickelsson et al. |
| 7,583,896 B2 | 9/2009 | Taniguchi et al. |
| 7,610,050 B2 | 10/2009 | Sayers et al. |
| 7,630,608 B2 | 12/2009 | Gallagher |
| 7,672,591 B2 | 3/2010 | Soto et al. |
| 7,814,717 B2 | 10/2010 | Wang |
| 7,827,581 B1 | 11/2010 | Eiger et al. |
| 7,861,272 B2 | 12/2010 | Russ et al. |
| 7,917,931 B2 | 3/2011 | Bertonis et al. |
| 7,957,777 B1 | 6/2011 | Vu et al. |
| 7,990,908 B2 | 8/2011 | Binder |
| 8,023,886 B2 | 9/2011 | Rofougaran |
| 8,023,997 B2 | 9/2011 | Hoiness et al. |
| 8,073,329 B2 | 12/2011 | Gao et al. |
| 8,098,990 B2 | 1/2012 | Hu et al. |
| 8,107,815 B2 | 1/2012 | Akasaka et al. |
| 8,175,459 B2 | 5/2012 | Thelen et al. |
| 8,184,681 B2 | 5/2012 | Binder et al. |
| 8,270,833 B2 | 9/2012 | Lin et al. |
| 8,325,759 B2 | 12/2012 | Hazani et al. |
| 8,351,792 B2 | 1/2013 | Zheng |
| 8,374,180 B2 | 2/2013 | Woo et al. |
| 8,374,508 B2 | 2/2013 | Soto et al. |
| 8,422,883 B2 | 4/2013 | Yeh et al. |
| 8,422,884 B2 | 4/2013 | Mao |
| 8,452,178 B2 | 5/2013 | Gao et al. |
| 8,488,966 B2 | 7/2013 | Zheng |
| 8,548,330 B2 | 10/2013 | Berlin et al. |
| 8,559,939 B2 | 10/2013 | Sabat, Jr. et al. |
| 8,599,958 B2 | 12/2013 | Schwarz et al. |
| 8,630,300 B2 | 1/2014 | Edmon |
| 8,634,764 B2 * | 1/2014 | Cruz .................... H01Q 21/007 343/700 MS |
| 8,639,121 B2 | 1/2014 | George et al. |
| 8,644,844 B2 | 2/2014 | Shapira et al. |
| 8,649,684 B2 | 2/2014 | Casterline et al. |
| 8,660,477 B2 | 2/2014 | Murray et al. |
| 8,671,431 B2 | 3/2014 | Centore, III et al. |
| 8,677,423 B2 | 3/2014 | Hicks, III et al. |
| 8,682,171 B1 | 3/2014 | Britz et al. |
| 8,737,454 B2 | 5/2014 | Lvala et al. |
| 8,750,266 B2 | 6/2014 | de Lind van Wijngaarden |
| 8,761,050 B2 | 6/2014 | Lu et al. |
| 8,824,457 B2 | 9/2014 | Bianchi et al. |
| 8,929,740 B2 | 1/2015 | Smith et al. |
| 8,947,319 B2 | 2/2015 | Simmons et al. |
| 8,976,670 B2 | 3/2015 | Meier et al. |
| 9,258,629 B2 | 2/2016 | Graves et al. |
| 9,264,741 B2 | 2/2016 | Murray et al. |
| 9,307,297 B2 | 4/2016 | Richman et al. |
| 9,332,014 B2 | 5/2016 | Keiser et al. |
| 9,332,402 B2 | 5/2016 | Wala |
| 9,344,183 B2 | 5/2016 | Eiger et al. |
| 9,391,723 B2 | 7/2016 | Matthews |
| 9,414,137 B2 | 8/2016 | Smith et al. |
| 9,419,715 B2 | 8/2016 | Samsuri et al. |
| 9,553,669 B2 | 1/2017 | Khemakhem et al. |
| 9,571,190 B2 | 2/2017 | Britz et al. |
| 9,787,400 B2 | 10/2017 | Bourg et al. |
| 9,871,564 B1 * | 1/2018 | Gu ........................ H04W 4/026 |
| 2002/0111077 A1 | 8/2002 | Keenum |
| 2002/0122230 A1 | 9/2002 | Izadpanah et al. |
| 2002/0128009 A1 | 9/2002 | Boch et al. |
| 2002/0131123 A1 * | 9/2002 | Clark .................. H04B 10/1125 398/118 |
| 2004/0054425 A1 | 3/2004 | Elmore |
| 2004/0110468 A1 | 6/2004 | Perlman |
| 2004/0151503 A1 | 8/2004 | Kashima et al. |
| 2004/0175173 A1 | 9/2004 | Deas |
| 2004/0203703 A1 | 10/2004 | Fischer |
| 2005/0018653 A1 | 1/2005 | Phillips et al. |
| 2005/0025505 A1 | 2/2005 | Soto et al. |
| 2005/0058451 A1 | 3/2005 | Ross |
| 2005/0093766 A1 | 5/2005 | Turner |
| 2005/0114023 A1 | 5/2005 | Williamson et al. |
| 2005/0289623 A1 | 12/2005 | Midani et al. |
| 2006/0045524 A1 | 3/2006 | Lee et al. |
| 2006/0045525 A1 | 3/2006 | Lee et al. |
| 2006/0067709 A1 | 3/2006 | Newberg et al. |
| 2006/0153517 A1 | 7/2006 | Reagan et al. |
| 2006/0182446 A1 | 8/2006 | Kim et al. |
| 2006/0209857 A1 | 9/2006 | Hicks, III |
| 2006/0253045 A1 | 11/2006 | Coifman |
| 2007/0019956 A1 | 1/2007 | Sorin et al. |
| 2007/0112939 A1 | 5/2007 | Wilson et al. |
| 2007/0224951 A1 | 9/2007 | Gilb et al. |
| 2007/0261060 A1 | 11/2007 | Manzano et al. |
| 2007/0286172 A1 | 12/2007 | Duran et al. |
| 2007/0286405 A1 | 12/2007 | Blake et al. |
| 2008/0013957 A1 | 1/2008 | Akers et al. |
| 2008/0024379 A1 * | 1/2008 | Urban .................. H01Q 1/1271 343/797 |
| 2008/0056224 A1 | 3/2008 | Hoiness et al. |
| 2008/0063397 A1 | 3/2008 | Hu et al. |
| 2008/0124086 A1 | 5/2008 | Matthews |
| 2008/0132188 A1 | 6/2008 | Nino et al. |
| 2008/0159744 A1 | 7/2008 | Soto et al. |
| 2008/0166094 A1 | 7/2008 | Bookbinder et al. |
| 2008/0200122 A1 | 8/2008 | Mann |
| 2008/0224869 A1 | 9/2008 | Kaplan |
| 2008/0225375 A1 | 9/2008 | Newberg et al. |
| 2008/0260389 A1 | 10/2008 | Zheng |
| 2009/0003221 A1 | 1/2009 | Burns et al. |
| 2009/0013210 A1 | 1/2009 | McIntosh et al. |
| 2009/0047016 A1 | 2/2009 | Bernard et al. |
| 2009/0047023 A1 | 2/2009 | Pescod et al. |
| 2009/0047900 A1 * | 2/2009 | Cruz .................... H01Q 21/007 455/7 |

(56) References Cited

U.S. PATENT DOCUMENTS

| | | | |
|---|---|---|---|
| 2009/0060531 A1 | 3/2009 | Biegert et al. | |
| 2009/0135068 A1* | 5/2009 | Cohen | H01Q 1/1271 343/700 MS |
| 2009/0169163 A1 | 7/2009 | Abbott, III et al. | |
| 2010/0014868 A1 | 1/2010 | McGlynn et al. | |
| 2010/0040372 A1 | 2/2010 | Gejbrowitz et al. | |
| 2010/0142955 A1 | 6/2010 | Yu et al. | |
| 2010/0150556 A1 | 6/2010 | Soto et al. | |
| 2010/0150566 A1 | 6/2010 | Soto et al. | |
| 2010/0158525 A1 | 6/2010 | Walter | |
| 2010/0197222 A1 | 8/2010 | Scheucher | |
| 2010/0209066 A1 | 8/2010 | Anderson et al. | |
| 2010/0239253 A1 | 9/2010 | Lin et al. | |
| 2011/0019999 A1 | 1/2011 | George et al. | |
| 2011/0055875 A1 | 3/2011 | Zussman | |
| 2011/0083152 A1* | 4/2011 | Centore, III | H04H 20/63 725/63 |
| 2011/0139942 A1 | 6/2011 | Moore et al. | |
| 2011/0200325 A1 | 8/2011 | Kobyakov et al. | |
| 2011/0206383 A1 | 8/2011 | Chien et al. | |
| 2011/0268446 A1 | 11/2011 | Cune et al. | |
| 2011/0274433 A1 | 11/2011 | Presi et al. | |
| 2011/0311033 A1 | 12/2011 | Binder | |
| 2012/0114076 A1 | 5/2012 | Morton et al. | |
| 2012/0257893 A1 | 10/2012 | Boyd et al. | |
| 2012/0309325 A1 | 12/2012 | Carbone et al. | |
| 2013/0034335 A1 | 2/2013 | Landry et al. | |
| 2013/0089336 A1 | 4/2013 | Dahlfort et al. | |
| 2013/0106641 A1 | 5/2013 | Warke et al. | |
| 2013/0201316 A1 | 8/2013 | Binder et al. | |
| 2013/0217336 A1 | 8/2013 | McCormack et al. | |
| 2013/0230325 A1 | 9/2013 | Chow et al. | |
| 2013/0266324 A1 | 10/2013 | Diab et al. | |
| 2014/0233951 A1 | 8/2014 | Cook | |
| 2014/0314061 A1 | 10/2014 | Trajkovic et al. | |
| 2015/0078756 A1 | 3/2015 | Soto et al. | |
| 2015/0098419 A1 | 4/2015 | Zavadsky et al. | |
| 2015/0125146 A1* | 5/2015 | Erreygers | H04B 10/25 398/58 |
| 2015/0236787 A1 | 8/2015 | Cook | |
| 2016/0134008 A1* | 5/2016 | Kim | H01Q 1/38 343/711 |
| 2016/0301474 A1 | 10/2016 | Bourg et al. | |
| 2016/0359564 A1 | 12/2016 | Chow et al. | |
| 2017/0195054 A1* | 7/2017 | Ashrafi | H04B 10/40 |
| 2017/0215090 A1* | 7/2017 | Lipowski | H04B 7/04 |
| 2017/0365908 A1* | 12/2017 | Hughes | G02F 1/1533 |
| 2018/0026722 A1* | 1/2018 | Ashrafi | H04B 10/40 398/115 |
| 2018/0090992 A1* | 3/2018 | Shrivastava | H02J 50/50 |
| 2018/0129172 A1* | 5/2018 | Shrivastava | G05B 15/02 |
| 2018/0248612 A1* | 8/2018 | Graham, III | H04B 7/1555 |
| 2018/0262272 A1* | 9/2018 | Ashrafi | H04L 27/366 |
| 2018/0278334 A1* | 9/2018 | Ashrafi | H04B 10/40 |
| 2018/0366815 A1* | 12/2018 | Rheinfelder | H04B 1/62 |
| 2018/0376228 A1* | 12/2018 | Erreygers | H04B 10/25 |

FOREIGN PATENT DOCUMENTS

| | | |
|---|---|---|
| CN | 203117847 U | 8/2013 |
| CN | 103619080 A | 3/2014 |
| CN | 105591185 A | 5/2016 |
| DE | 69130642 T2 | 9/1999 |
| DE | 69704862 T2 | 8/2001 |
| EP | 1128651 A2 | 8/2001 |
| EP | 1250728 B1 | 4/2004 |
| EP | 2180614 A1 | 4/2010 |
| FR | 2838000 A1 | 10/2003 |
| GB | 693435 A | 7/1953 |
| GB | 1418447 A | 12/1975 |
| GB | 2460500 A | 12/2009 |
| JP | 10013121 A | 1/1998 |
| JP | 2000101499 A | 4/2000 |
| JP | 2001069150 A | 3/2001 |
| JP | 2002026953 A | 1/2002 |
| JP | 2004197993 A | 7/2004 |
| JP | 2009010595 A | 1/2009 |
| JP | 04256109 B2 | 4/2009 |
| JP | 2011210810 A | 10/2011 |
| JP | 2012018645 A | 1/2012 |
| JP | 05057487 B2 | 10/2012 |
| JP | 2014064360 A | 4/2014 |
| KR | 2005005909 A | 1/2005 |
| KR | 899228 B1 | 5/2009 |
| KR | 900268 B1 | 5/2009 |
| KR | 2010013586 A | 2/2010 |
| KR | 2010016832 A | 2/2010 |
| KR | 2010060321 A | 6/2010 |
| KR | 2011062716 A | 6/2011 |
| KR | 1077532 B1 | 10/2011 |
| KR | 1155568 B1 | 6/2012 |
| KR | 2014004455 A | 1/2014 |
| KR | 1403978 B1 | 6/2014 |
| KR | 2014090002 A | 7/2014 |
| WO | 9631983 A1 | 10/1996 |
| WO | 0067458 A1 | 11/2000 |
| WO | 0156233 A1 | 8/2001 |
| WO | 2011139942 A1 | 11/2011 |
| WO | 2013130921 A1 | 9/2013 |

OTHER PUBLICATIONS

Author Unknown, "2Wire Unveils World's First Outdoor Broadband Home Gateway," PRNewswire, Jan. 5, 2006, 2Wire, Inc., 4 pages.

Author Unknown, "Outrigger Media Access Portal (MAP) take Triple Play service delivery to the next level," Product Specification, NY-MDS-125, Oct. 2008, tii Network Technologies, Inc., 2 pages.

Author Unknown, "Turn Broadband Inside Out: HomePortal iNID Outdoor Residential Gateway," Product Specification, Revision B, Jan. 2007, 2Wire, Inc., 2 pages.

Cartaxo, Adolfo, et al., "A Perspective on Optical-Wireless Converged NG-FTTH Networks Using Directly Modulated Lasers," International Conference on Transparent Optical Networks, Jun. 26-30, 2011, 4 pages.

Clark, Jack, "Google Plots Cheaper Wireless Future to Expand Fiber Project," Bloomberg News, Jul. 28, 2016, Bloomberg L.P., 6 pages.

D'Onfro, Von Jillian, "Google is expanding its tests on the way to blanketing the US in super-fast wireless Internet," Business Insider, Aug. 11, 2016, 2 pages.

Llorente, Roberto, et al., "Fully Converged Optical, Millimetre-Wave Wireless and Cable Provision in OFDM-PON FTTH Networks," International Conference on Transparent Optical Networks, Jun. 23-27, 2013, 4 pages.

International Search Report and Written Opinion for PCT/US2007/019203, dated May 14, 2008, 9 pages.

International Preliminary Report on Patentability for PCT/US2007/019203, dated Mar. 3, 2009, 7 pages.

International Search Report for PCT/US20131028493, dated Jun. 24, 2013, 4 pages.

Non-Final Office Action for U.S. Appl. No. 11/513,941, dated Mar. 29, 2010, 11 pages.

Final Office Action for U.S. Appl. No. 11/513,941, dated Sep. 17, 2010, 16 pages.

Advisory Action for U.S. Appl. No. 11/513,941, dated Dec. 7, 2010, 3 pages.

Non-Final Office Action for U.S. Appl. No. 13/410,936, dated Jan. 26, 2015, 13 pages.

Final Office Action for U.S. Appl. No. 13/410,936, dated Jul. 22, 2015, 19 pages.

Advisory Action for U.S. Appl. No. 13/410,936, dated Sep. 17, 2015, 3 pages.

Non-Final Office Action for U.S. Appl. No. 13/410,936, dated Feb. 25, 2016, 25 pages.

Final Office Action for U.S. Appl. No. 13/410,936, dated Aug. 24, 2016, 24 pages.

(56) References Cited

OTHER PUBLICATIONS

Examiner's Answer to the Appeal Brief for U.S. Appl. No. 13/410,936, dated Apr. 6, 2017, 29 pages.

Non-Final Office Action for U.S. Appl. No. 15/090,709, dated Mar. 3, 2017, 13 pages.

Author Unknown, "Wireless bridge takes high-speed communications to 'last mile'," Sify News, Feb. 28, 2012, Sify Technologies Ltd, 4 pages.

Author Unknown, "Digital," Focal Dictionary of Telecommunications, 1999, Focal Press, 2 pages.

Author Unknown, "Pulse Amplitude Modulation (PAM)," Focal Dictionary of Telecommunications, 1999, Focal Press, 2 pages.

Kimura, Yuichi, et aL, "A Low-Cost and Very Compact Wireless Terminal Integrated on the Back of a Waveguide Planar Array for 26 GHz Band Fixed Wireless Access (FWA) Systems," IEEE Transactions on Antennas and Propagation, vol. 53, Issue 8, Aug. 2005, pp. 2456-2463.

Koonen, Ton, "Fiber to the Home/Fiber to the Premises: What, Where, and When?," Proceeding of the IEEE, vol. 94, Issue 5, May 2006, pp. 911-934.

Lin, You-Min, et al., "Next-Generation Ofdma-Based Passive Optical Network Architecture Supporting Radio-Over-Fiber," IEEE Journal on Selected Areas in Communications, vol. 28, Issue 6, Aug. 2010, pp. 791-799.

Yoshie, Tomotaka, et al., "Advanced Wireless IP Access System (WIPAS) for Fixed Wireless Access (FWA)-Broadband Access System for triple place services by "Fiber + Radio"," 19th Annual IEEE International Symposium on Personal, Indoor and Mobile Radio Communications, 2008, IEEE, 5 pages.

Examination Report for European Patent Application No. 13709679.8, dated May 11, 2017, 5 pages.

Non-Final Office Action for U.S. Appl. No. 15/241,247, dated Mar. 7, 2018, 23 pages.

Final Office Action for U.S. Appl. No. 15/241,247, dated Sep. 7, 2018, 24 pages.

Notice of Allowance for U.S. Appl. No. 13/410,936, dated Jul. 27, 2018, 8 pages.

Decision on Appeal for U.S. Appl. No. 13/410,936, dated Jan. 31, 2018, 12 pages.

Examiner's Answer to the Appeal Brief for U.S. Appl. No. 15/241,247, dated Apr. 29, 2019, 28 pages.

\* cited by examiner

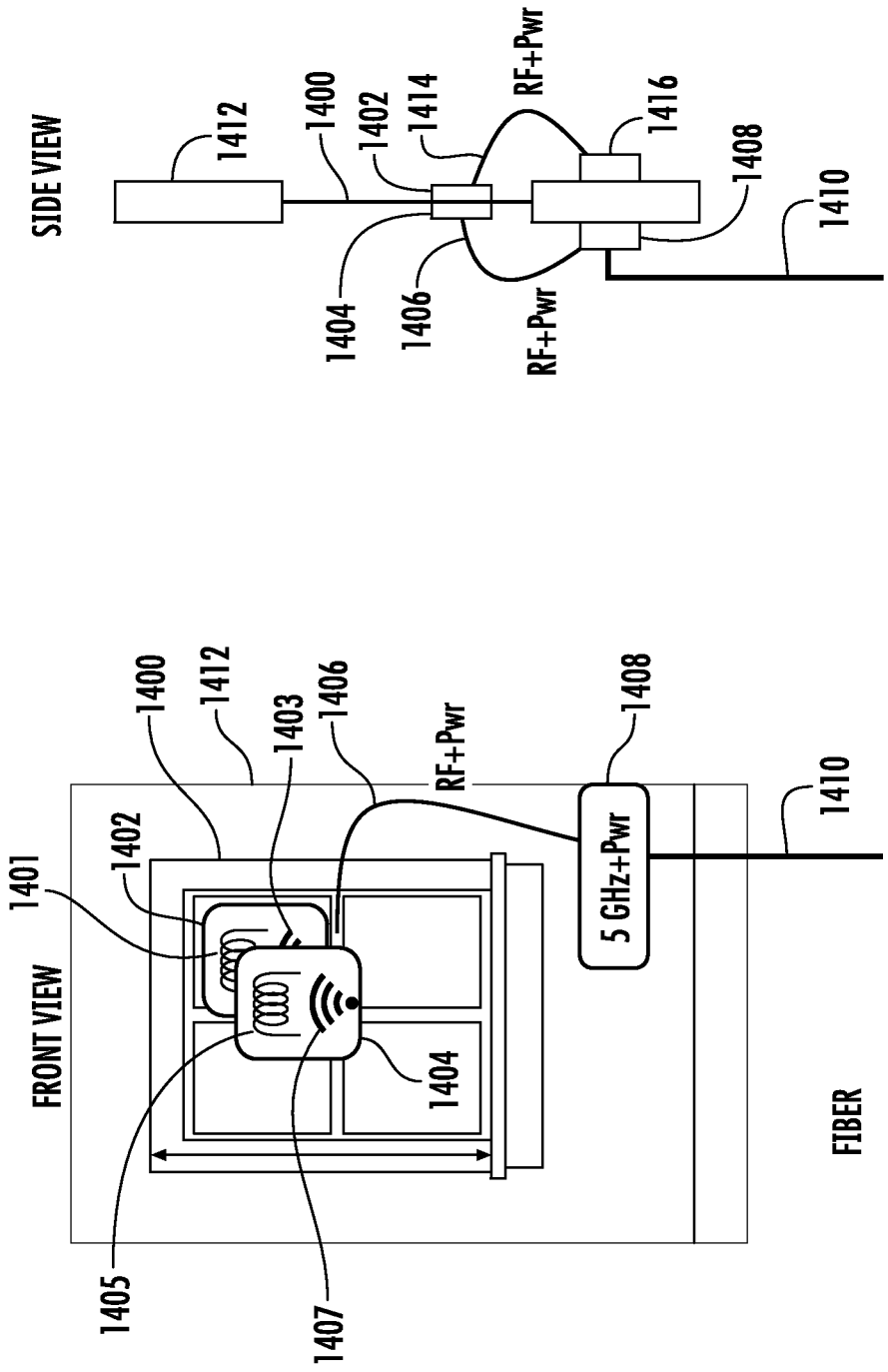

TRANSPARENT WIRELESS BRIDGES FOR OPTICAL FIBER-WIRELESS NETWORKS AND RELATED METHODS AND SYSTEMS

CROSS REFERENCE TO RELATED APPLICATIONS

This application claims the benefit of priority of U.S. Provisional Application Ser. No. 62/421,490, filed Nov. 14, 2016, the content of which is relied upon and incorporated herein by reference in its entirety.

BACKGROUND

The disclosure relates generally to an optical fiber network system, such as a passive optical network (PON) system, and more particularly to providing a subscriber or customer with access to a fiber optical network via a wireless bridge to or near a dwelling, home, office, or other building or location.

High definition video distribution and high speed internet data access have been driving the bandwidth demand of internet subscribers inside homes, offices, and other premises over the past years. Twisted pair and other copper based access technology have difficulty meeting the bandwidth requirement for a good quality of services. In contrast, optical fiber to the home (FTTH), fiber to the business or building (FTTB), fiber to the node (FTTN), fiber to the curb or cabinet (FTTC), and fiber to the premises (FTTP) systems, for example, provide a sustainable optical fiber-based solution to deliver high speed, high bandwidth services for data, voice, and video access. Today, many broadband access solutions are enabled by such FTTH/FTTB/FTTN/FTTC/FTTP, also known here as FTTX solutions, all over the world. In these FTTX solutions, optical fiber is installed from a central point directly to individual buildings such as residences, apartment buildings, and businesses to provide unprecedented high-speed Internet access. In some cases the FTTX deployment is done with fiber and copper for the last section.

In today's FTTX deployments, a critical step is to physically access the building or premises of the subscribers, such as individual houses, apartments or multi-dwelling units (MDUs). Such physical access includes, but is not limited to, a technician entering the subscriber's premises, drilling holes through building walls, installing and commissioning the fibers and hardware inside the premises, and so forth. The terms "building" and "premise" are used interchangeably in this disclosure to connote a building having end-user devices on a passive optical network (PON) for single family unit (SFU), multiple-family unit (MFU) or other service delivery of voice, data, video, etc., services.

One of the challenges in FTTX deployments is the fiber deployment. There are many cases in which gaining physical access to the home or office building with fiber is a challenge, especially in existing MDUs (Multiple Dwelling Units) or large office buildings. Without such physical access, the installers cannot deploy or maintain the physical infrastructure and enable the service subscription. The need for physical access to the installation premises can be a major impediment due to the fact that such physical access may involve multiple site access authorizations (from apartment owners, building owners, etc.) since it is not possible to access all units of the building at once, and multiple visits to the building by the service provider is required. It also requires more labor and is more costly for the service provider to physically install the infrastructure, and results in inconvenience and disturbance to the daily life of the subscribers. As a result, such physical access to the premises can lead to a higher cost of deployment, less customer satisfaction, a slower deployment process, and the like, which may make a FTTX deployment too expensive in light of other alternatives. In some cases, gaining access can be the primary concern that inhibits the whole service deployment.

Thus, it may be beneficial to have a better way to improve the distribution and installation of high-speed communications to consumers in a variety of homes, businesses and premises.

No admission is made that any reference cited herein constitutes prior art. Applicant expressly reserves the right to challenge the accuracy and pertinency of any cited documents.

SUMMARY

For optical fiber networks, one issue may be physical access to buildings to deploy the optical fiber to the building itself. Another issue may be that signals may experience loss as they pass through the walls of a building, especially when they pass through heavy concrete walls with embedded metal walls as used in many modern office and apartment buildings. Systems and methods are disclosed herein that provide for more convenient and lower cost installation and deployment of a fiber optic communications system that do not require deploying fiber into the building. In particular, a transparent wireless bridge is disclosed that allows a subscriber or customer access to an optical fiber network without having to have fiber run all the way to the customer premises, where the transparent wireless bridge is placed on an existing window of a building. Access to an optical fiber network may be achieved without requiring penetration of a wall or other physical access inside a customer's building or premises.

One embodiment of the disclosure relates to a wireless bridge for providing access to an optical fiber network. The wireless bridge comprises at least one first transceiver located outside a building and configured to transmit and receive communication signals to and from the optical fiber network. The wireless bridge further comprises a first glass sheet attached to an outer side of a window of the building, wherein the first glass sheet comprises a first antenna disposed on the first glass sheet. The first antenna is communicatively coupled to the at least one first transceiver and is configured to transmit and receive communication signals to and from the at least one first transceiver. The wireless bridge further comprises a second glass sheet attached to an inner side of the window of the building, wherein the second glass sheet comprises a second antenna disposed on the second glass sheet. The second antenna is configured to wirelessly transmit and receive communication signals to and from the first antenna disposed in the first glass sheet. The wireless bridge further comprises at least one second transceiver located inside the building, the at least one second transceiver being communicatively coupled to the second antenna and configured to wirelessly transmit and receive data to and from the second antenna. In this manner, the at least one second transceiver located inside the building is configured to transmit and receive communication signals to and from the at least one first transceiver located outside the building via the first antenna and the second antenna such that the at least one second transceiver has access to the optical fiber network.

The transparent wireless bridge provides for more convenient and lower cost installation and deployment of a fiber optic communications system. A system that uses a transparent wireless bridge on a window of a building allows for signals to be transmitted through one or more existing windows of the building rather than through the walls of the building, allowing improved signal transmission. In one embodiment, a transparent wireless bridge may be used in conjunction with a wireless drop, allowing further access to an optical fiber network without having to install additional fiber.

An additional embodiment of the disclosure relates to a passive optical network (PON) system. The PON comprises an optical line termination (OLT) located outside a building, an optical network terminal (ONT) located inside the building, and a wireless bridge disposed between the OLT and the ONT. The wireless bridge comprises at least one first transceiver located outside a building and configured to transmit and receive communication signals to and from an optical fiber network. The wireless bridge further comprises a first glass sheet attached to an outer side of a window of the building, wherein the first glass sheet comprises a first antenna disposed on the first glass sheet. The first antenna is communicatively coupled to the at least one first transceiver and is configured to transmit and receive communication signals to and from the at least one first transceiver. The transceiver bridge comprises a second glass sheet attached to an inner side of the window of the building, wherein the second glass sheet comprises a second antenna disposed on the second glass sheet. The second antenna is configured to wirelessly transmit and receive communication signals to and from the first antenna disposed in the first glass sheet. The wireless bridge further comprises at least one second transceiver located inside the building, the at least one second transceiver being communicatively coupled to the second antenna and configured to wirelessly transmit and receive data to and from the second antenna.

In another embodiment of the disclosure, a wireless drop system is disclosed. The wireless drop system comprises at least one wireless drop terminal located outside a building and communicatively coupled to an optical fiber network. The at least one wireless drop terminal is configured to transmit communication signals received from the optical fiber network wirelessly toward the building. The wireless drop system further comprises at least one first transceiver located outside the building and configured to transmit and receive communication signals wirelessly to and from the at least one wireless drop terminal. The wireless drop system also comprises a first glass sheet attached to an outer side of a window of the building, the first glass sheet comprising a first antenna disposed on the first glass sheet. The first antenna is communicatively coupled to the at least one first transceiver and configured to transmit and receive communication signals to and from the at least one first transceiver. The wireless drop system further comprises a second glass sheet attached to an inner side of the window of the building, wherein the second glass sheet comprises a second antenna disposed on the second glass sheet. The second antenna is configured to wirelessly transmit and receive communication signals to and from the first antenna disposed in the first glass sheet. The wireless drop system further comprises at least one second transceiver located inside the building, the at least one second transceiver being communicatively coupled to the second antenna and configured to wirelessly transmit and receive data to and from the second antenna. In this manner, the at least one second transceiver located inside the building is configured to transmit and receive communication signals to and from the at least one first transceiver located outside the building via the first antenna and the second antenna such that the at least one second transceiver has access to the optical fiber network through the at least one wireless drop terminal.

In another embodiment of the disclosure, a method for providing access to an optical fiber network is disclosed. The method comprises receiving communication signals from the optical fiber network at one or more first transceivers located outside a building. The communication signals are transmitted from the one or more first transceivers to a first antenna disposed on a first glass sheet attached to an outer side of a window of the building and communicatively coupled to the one or more first transceivers. The method also comprises transmitting the communication signals wirelessly from the first antenna to a second antenna disposed on a second glass sheet attached to an inner side of the window. The communication signals are then transmitted from the second antenna to at least one second transceiver located inside the building, the at least one second transceiver being communicatively coupled to the second antenna. In this manner, the at least one second transceiver located inside the building is configured to wirelessly transmit and receive communication signals to and from the one or more first transceivers located outside the building via the first antenna and the second antenna such that the at least one second transceiver has access to the optical fiber network.

Another embodiment of the disclosure relates to a method of providing a wireless drop system. The method comprises positioning at least one wireless drop terminal outside a building, the at least one wireless drop terminal communicatively coupled to an optical fiber network. Communication signals received from the optical fiber network are transmitted wirelessly toward the building from the at least one wireless drop terminal. The method further comprises transmitting the communication signals from one or more first transceivers to a first antenna disposed on a first glass sheet attached to an outer side of a window of the building and communicatively coupled to the one or more first transceivers. The communication signals are transmitted wirelessly from the first antenna to a second antenna disposed on a second glass sheet attached to an inner side of the window. The method further comprises transmitting the communication signals from the second antenna to at least one second transceiver located inside the building, the at least one second transceiver being communicatively coupled to the second antenna. In this manner, the at least one second transceiver located inside the building is configured to wirelessly transmit and receive communication signals to and from the one or more first transceivers located outside the building via the first antenna and the second antenna such that the at least one second transceiver has access to the optical fiber network.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 14A is a front view of an exemplary wireless bridge implemented in a window of a building;

FIG. 14B is a side view of the exemplary wireless bridge of FIG. 14A;

DETAILED DESCRIPTION

Figure 1:
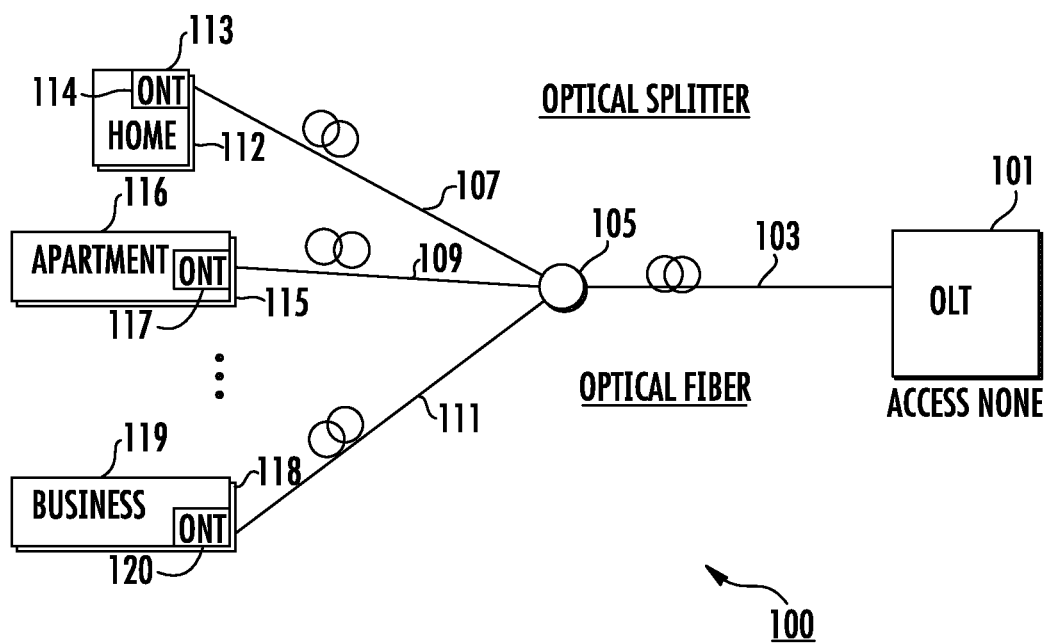
FIG. 1 is a prior art distribution system to a building with an optical fiber passing through a wall of the building.

For optical fiber networks, one issue may be physical access to buildings to deploy the optical fiber to the building itself. Another issue may be that signals may experience loss as they pass through the walls of a building, especially when they pass through heavy concrete walls with embedded metal walls as used in many modern office and apartment buildings. Systems and methods are disclosed herein that provide for more convenient and lower cost installation and deployment of a fiber optic communications system that do not require deploying fiber into the building. In particular, a transparent wireless bridge is disclosed that allows a subscriber or customer access to an optical fiber network without having to have fiber run all the way to the customer premises, where the transparent wireless bridge is placed on an existing window of a building. Access to an optical fiber network may be achieved without requiring penetration of a wall or other physical access inside a customer's building or premises.

One embodiment of the disclosure relates to a wireless bridge for providing access to an optical fiber network. The wireless bridge comprises at least one first transceiver located outside a building and configured to transmit and receive communication signals to and from the optical fiber network. The wireless bridge further comprises a first glass sheet attached to an outer side of a window of the building, wherein the first glass sheet comprises a first antenna disposed on the first glass sheet. The first antenna is communicatively coupled to the at least one first transceiver and is configured to transmit and receive communication signals to and from the at least one first transceiver. The wireless bridge further comprises a second glass sheet attached to an inner side of the window of the building, wherein the second glass sheet comprises a second antenna disposed on the second glass sheet. The second antenna is configured to wirelessly transmit and receive communication signals to and from the first antenna disposed in the first glass sheet. The wireless bridge further comprises at least one second transceiver located inside the building, the at least one second transceiver being communicatively coupled to the second antenna and configured to wirelessly transmit and receive data to and from the second antenna. In this manner, the at least one second transceiver located inside the building is configured to transmit and receive communication signals to and from the at least one first transceiver located outside the building via the first antenna and the second antenna such that the at least one second transceiver has access to the optical fiber network.

The transparent wireless bridge provides for more convenient and lower cost installation and deployment of a fiber optic communications system. A system that uses a transparent wireless bridge on a window of a building allows for signals to be transmitted through one or more existing windows of the building rather than through the walls of the building, allowing improved signal transmission. In one embodiment, a transparent wireless bridge may be used in conjunction with a wireless drop, allowing further access to an optical fiber network without having to install additional fiber.

The transparent wireless bridge disclosed herein provides a simple and cost-effective solution that avoids a requirement for physical access to the premises. The disclosed solution utilizes wireless technology to bridge the connectivity between indoor devices at a location or premises, such as an optical network terminal (ONT) or Customer Premises Equipment (CPE), and any outdoor network hardware or infrastructure that carries the data from the optical line termination (OLT) in a passive optical network (PON). The present disclosure is not limited to PONs and may also be used in conjunction with any optical fiber network, including an active-optical-network. Uplink and downlink wireless connectivity through a window replaces a physical optical fiber penetration through the building structure. The present disclosure uses paired radio transceivers and a wireless bridge located on a window of the building to avoid the problems associated with physical optical fibers going through walls or the frame of windows of an installation building, which may require, for example, drilling through the wall or the frame of a window by highly trained technical staff.

The disclosed transparent wireless bridge avoids any need for a physical fiber to go through the walls of a building or premises by utilizing wireless connectivity across an existing window of a building. The wireless links having the required dedicated capacity are used to provide the required outside-to-inside (and vice versa) connectivity across the building partitions. This provides the subscriber or customer in the last mile, i.e., at the far end of the network, with complete broadband network access, that is, with access to a passive optical network (PON) via, for example, fiber to the home (FTTH), fiber to the business or building (FTTB), fiber to the node (FTTN), fiber to the curb or cabinet (FTTC), or fiber to the premises (FTTP), the group abbreviated herein as "FTTX." The required hardware inside the subscriber's premises is attached to (or placed near) a transceiver inside the building (window or wall), which then connects wirelessly to a matching transceiver placed outside the same building partition, the second or matching hardware either attached to or placed near the partition or wall. The transceiver on the outside of the partition is then connected to the traditional optical fiber FTTX infrastructure through PON networks. The wireless connection provides logical transparency to both the end user and the network operator in terms of functionality.

The embodiments disclosed herein change the final link of the optical network, such as a passive optical network, to the user or subscriber. The network or service provided remains the same, with the same bandwidth connection as before. The difference between this disclosure and conventional systems is that the optical fiber itself does not penetrate the wall or window frame of the user's location. With a robust and reliable pair of matching transceivers as disclosed herein, the transitions and links from the PON network to devices inside of a premise are transparent to the user in terms of speed and access and network reliability.

Various embodiments will be further clarified by the following examples.

Before disclosing the wireless solutions used to bridge the connectivity between indoor devices at a location or premises, such as an optical network terminal (ONT) or Customer Premises Equipment (CPE), and any outdoor network hardware or infrastructure that carries the data from the optical line termination (OLT) in an optical fiber network, a prior art distribution system for an optical fiber network is discussed.

FIG. 1 depicts a prior art distribution system to a building with an optical fiber penetrating a wall of the building. This typical FTTX deployment 100 employs passive optical network technology, with the optical fibers penetrating the building partition such as walls 112, 115, 118. The optical line termination (OLT) 101 occurs outside the subscriber's building or premises. The optical line terminations of the network are within the operator's access network and may be located in the central office of the FTTX service provider. In this example, optical line termination (OLT) 101 may provide several services via an optical fiber 103.

As seen in FIG. 1, the optical line termination (OLT) 101 from an access node (not shown) routes communications via the optical fiber 103 (e.g., a single or pair of optical fibers) to an optical combiner/splitter 105. In this example, the optical combiner/splitter 105, which may be as in this example a 1:32 optical combiner/splitter, for example, splits or distributes the signals on the optical fiber 103 to up to 32 separate optical fibers for customers or users. Each of these 32 optical fibers may be routed to a separate premises, such as a home 113, an apartment 116, and a business 119 building or an office. FIG. 1 illustratively depicts three optical fibers 107, 109, and 111 routed to home 113, apartment 116, and business 119, respectively. It is understood that the optical combiner/splitter 105 also acts as a combiner, combining uplink signals from the optical fibers 107, 109, 111 from user locations (e.g., the 32 optical fibers) onto the single optical fiber 103 to send through optical line termination (OLT) 101 to the optical network for distribution to users at other terminal points of the optical network. In order to combine more than one signal on an optical fiber, the communications may be multiplexed.

Each of optical fibers 107, 109, 111 terminates at optical network terminal (ONT) 114, 117, and 120 located in the home 113, the apartment 116, and the business 119, respectively. Further, each of optical fibers 107, 109, 111 used in the FTTX deployment 100 is seen to go through or to penetrate the walls 112, 115, and 118 of the home 113, the apartment 116, and the business 119, respectively. These walls 112, 115, 118 through which the optical fibers 107, 109, 111 must pass are illustratively walls or the frame holding the window. While the FTTX deployment 100 depicted in FIG. 1 provides a very good connection, it is also costly.

Having thus introduced background on the general configuration of optical networks and distribution of communications systems, we now turn to communications systems and method that are provided by this disclosure. Broadly speaking, the present disclosure teaches a method and system implementations thereof that include receiving data from a passive optical network (PON) outside a building, wirelessly transmitting the received PON data to inside the building, and applying the received PON data to a network inside the building. The data received outside the building is from an optical line termination (OLT). An (OLT) is within the access network of the provider or operator and may be located at a central office or head-end unit. Data from the network inside the building is also uplinked to the OLT over the PON. The PON data wirelessly transmitted inside the building may be applied to an optical network terminal (ONT) inside the building. Alternatively, the wirelessly received PON data may be converted to Ethernet format and applied to a user interface and/or a gateway interface all inside the building. The wireless transmission of PON data may be via a first transceiver mounted on a surface outside the building and a second transceiver mounted on a surface inside the building. The surface may be a corridor, a window, a door, a walls and a façade.

Advantageously, this disclosure avoids the need for optical fibers to go through or penetrate partitions or walls of a customer's home or premises because the PON data is bi-directionally transmitted across the partitions or walls wirelessly. The installer can thus avoid a very time-intensive and cost-intensive installation of optical fibers through partitions or walls of a premises when deploying communications distribution systems.

Figure 2:
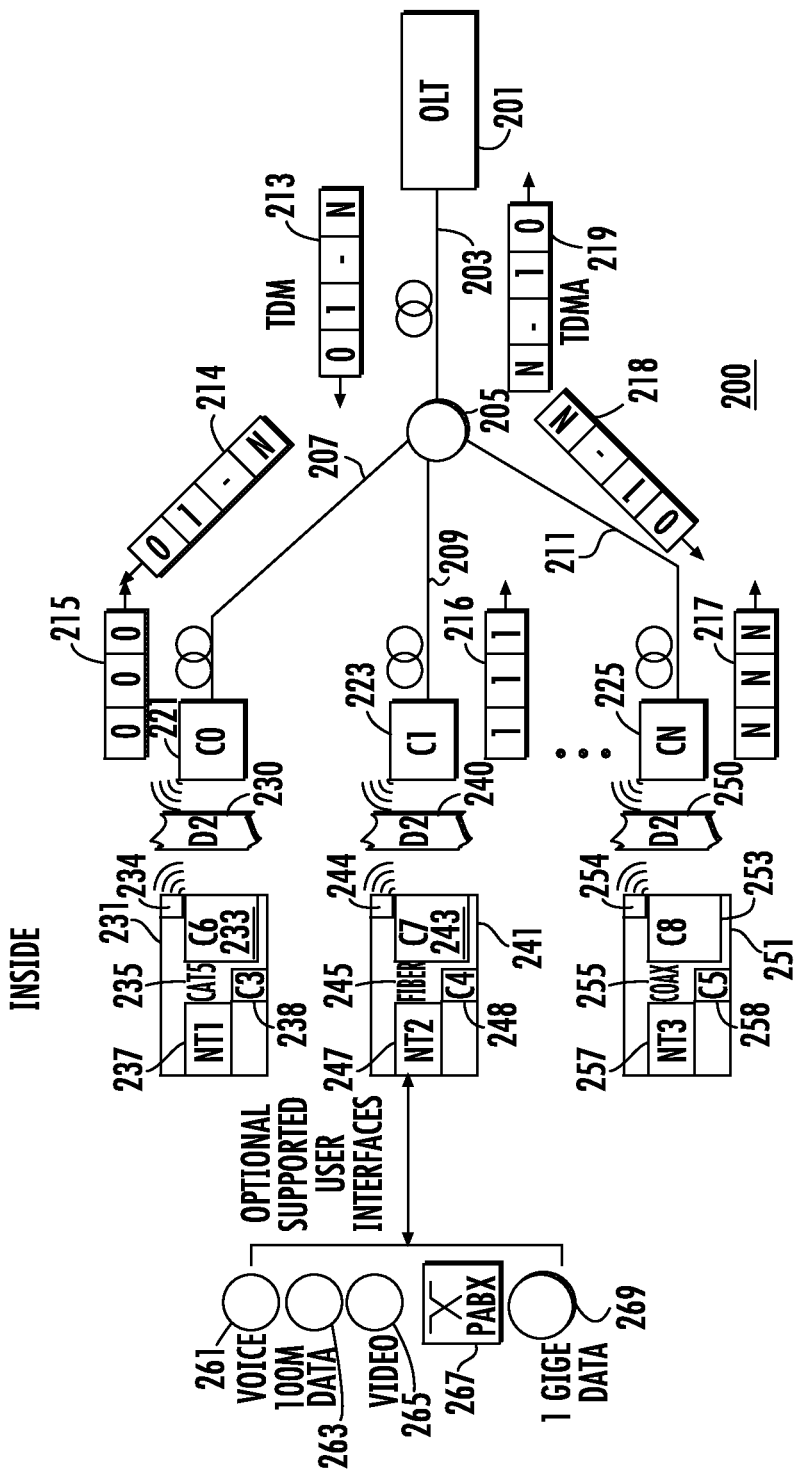
FIG. 2 is an embodiment of an illustrative first system architecture of this disclosure.

FIG. 2 depicts an illustrative passive optical network (PON) 200 of this disclosure. The PON 200 includes at least one optical fiber 203 coupled to an optical line termination (OLT) 201 of a PON 200. At least one first transceiver 221, 223, 225 outside a building is communicatively coupled to a terminal end of the at least one optical fiber 203. The at least one first transceiver 221, 223, 225 is configured for wirelessly transmitting to and receiving data from the PON 200. At least one second transceiver 234, 244, 254 is located inside buildings 231, 241, 251, respectively. Second transceivers 234, 244, 254 are configured to wirelessly transmit to and receive data from the at least one first transceiver 221, 223, 225, with which it is associated. The PON 200 also includes a module for implementing a user interface 233, 243, 253, a module for implementing a radio frequency (RF) to Ethernet conversion 238, 248, 258, and a module for implementing a gateway interface 237, 247, 257. The module for implementing the user interface 233, 243, 253 are user interfaces that are further explained later. The module for implementing a radio frequency (RF) to Ethernet conversion 238, 248, 258 is a conventional RF to Ethernet converter. The module for implementing a gateway interface 237, 247, 257 accommodates different user residential gateways with end-user device interfaces such as Plain Old Telephone Service (POTS) 261, 100BaseT 263, 1000BaseT 269, IP-Video 265, Private Automated Branch Exchange (PABX) 267. Other optional interfaces may be provided such as an interface for television or other future end-user interfaces not currently defined. These end-user device interfaces couple to user devices (not shown) which enable a user to access the indicated media. As shown in FIG. 2, the user interface 233, 243, 253 may be connected to gateway interface 237, 247, 257 using CAT5 235, Fiber 245, and Coax 255, respectively.

The user interface module, the RF to Ethernet conversion module, and the gateway interface module are communicatively coupled to the at least one second transceiver 234, 244, 254 and are configured for transmitting to and receiving data from the PON 200. The first and second associated transceiver pairs allow PON 200 data to be advantageously bi-directionally transmitted wirelessly across partitions 230, 240, 250. This avoids the need for optical fibers 207, 209, 211 to have to pass through partitions 230, 240, 250 at great time and expense to the provider.

FIG. 2 has been drawn in detail to disclose the functionality of the system. One or more functionalities of this disclosure, and FIG. 2, may be bundled together and implemented with very compact circuitry and hardware. For example, the first transceiver and the second transceiver are an RF transceiver that may take the form of a very small microcircuit. The microcircuit may further include an integral physical layer interface, such as an Ethernet converter, and a simple output comprising one or more twisted wire pairs or coax cable. The microcircuit may be mounted on a small circuit board with a connector and a place for a battery or a power supply. In some instances, the RF transceiver may be bundled together with an output network terminal (ONT) to perform user interface 233, 243, 253 functionalities, the RF to Ethernet conversion 238, 248, 258 functionalities, and the gateway interface 237, 247, 257 functionalities. In this example, the foregoing functionalities and all necessary conversions therebetween may co-exist on a very small circuit board or module.

It should be understood that end-user devices are not limited to these embodiments. For instance, each customer user interface described above uses only a single medium for input/output to the user's premises (e.g., optical fiber 245, CAT5 235, or coax cable 255). However, user interfaces in a premise may include more than a single medium optical fiber 245, CAT5 235, or coax cable 255. The user interfaces may include a combination of an optical fiber and a coaxial output, or a fiber optic output and a Gigabit Ethernet CAT5 output (twisted pair or pairs), and so forth. In a similar manner, it should be understood that each user interface in a premise may support a plurality of input/output end-user devices. As shown in FIG. 2, each residential gateway interface 237, 247, 257 with end-user device interfaces may have a two-way connection to a plurality of end-user devices. For example, residential gateway interface 237 may support voice communications such as POTS 261 with a cell phone (not shown) in building 231 while also supporting 100 M data communications such as 100BaseT 263, video communications such as IP-Video 265, PABX 267, and high-speed 1 Gigabit data systems such as 1000BaseT 269 with a computing device such as a personal computer, a laptop, a tablet, or a smart phone also in building 231. Each of these end-user devices is supported by an appropriate gateway, such as residential gateway interface 237 in this example that provides the user interfaces.

The Residential gateway interface 237, 247, 257 may include interfaces suitable for POTS, 100BaseT (fast internet for twisted pair cable), 1000BaseT (fast internet with four pairs of CAT5 unshielded twisted pairs), an IP-Video interface, Cable TV interface, a PABX interface, and so forth. Other suitable interfaces may be used for compatibility with these and/or other end-user devices.

Services that may be provided to the buildings 231, 241, 251 may include narrow band (NB) communication and broad band (BB) communications. Narrow band communications from the network may be provided to OLT 201 via an E1 line or a T1 line, with capabilities, respectively, of 2048 Mbit/s and 1554 Mbit/s. Broad band services may be provided to OLT 201 via a Gigabit Ethernet cable and may utilize synchronous transport module or an optical carrier. These inputs may also be connected via a cross connector (CC) through a single access node. The access node may also include the previously identified OLT output typically to nearby subscribers. Services typically available include all normal and customary communications services provided through passive optical networks. These services may include voice communications, such as telephone, VOIP services and private automatic branch exchange (PABX) switchboard services, video services, data services, such as internet or other data services. In FIG. 2, as in all other examples, each connection to an optical network terminal (ONT) may have the ability to have its signal routed to other connections or nodes throughout the optical network.

In operation, the passive optical network (PON) 200, from the right-hand side of the figure, routes communications to first transceiver 221, 223, 225, which in this example are associated with several customers, indicated as C0, C1 . . . CN. The passive optical network (PON) 200 includes the optical line termination (OLT) 201 providing network access via the optical fiber 203 to a splitter/combiner 205, similar to the splitter/combiner previously discussed. On the downlink path, the splitter/combiner 205 splits the signals on optical fiber 203 depicted as signal 213 into three signals, one applied to each separate optical fiber 207, 209, 211. Only downlink signal 214 applied to optical fiber 207 and downlink signal 218 applied to optical fiber 211 are shown in FIG. 2. On the uplink path, the splitter/combiner 205 combines the signals 215, 216, 217 on optical fibers 207, 209, 211, respectively into a single signal 219 on optical fiber 203 for transmission to the optical line termination (OLT) 201.

FIG. 2 depicts the scheme for the signals on optical fibers 207, 209, 211 sharing the same frequency channel on optical fiber 203 as time division multiplexing (TDM) and time division multiple access (TDMA). Alternatively, wave division multiplexing (WDM) and wave division multiple access (WDMA) and other schemes for channel sharing may also be used with an alternate embodiment. As previously explained, the associated pair of first transceiver 221, 223, 225 and second transceiver 234, 244, 254 allow PON data to be advantageously bi-directionally transmitted wirelessly across partitions 230, 240, 250. This avoids the need for the optical fibers 207, 209, 211 to have to pass through partitions 230, 240, 250 at great time and expense to the provider.

More specifically, the optical line terminal (OLT) 201 acts as an access node to communications services with an optical fiber output signal 203. The services may be multiplexed. For example, digital time division multiplexing (TDM) 213 and analog time division multiple access (TDMA) signal 219 services may be provided through the optical fiber 203. The optical fiber and the multiplexing may be used both for downlinks to the user from the services and uplinks from the user to the services, although multiplexing may not be required or used for downloads. Other convenient ways to multiplex the signals may also be used, e.g., wavelength division multiplexing (WDM) and wave division multiple access (WDMA). Multiplexing of downlink signals 213 is shown in FIG. 2, the signals having a left-ward pointing arrow, by dividing the signals into packets labeled 0, 1, -- and N, indicating that each user sees the same incoming signal, but the individual's equipment detects and decodes only those signals intended for the user. Uplink signals 215, 216, 217 are shown as a series of packets with right-ward pointing arrows, labeled only from the originating user, e.g., 0-0-0, 1-1-1 or N-N-N. Note that when the uplink signals 215, 216, 217 are multiplexed by combiner/splitter 205, the resulting signal 219 again shows separate packets labeled according to the user of origin, that is, 0, 1, -- or N. Encryption may be used in the passive optical network (PON) 200 and for communications downloaded to users. Encryption may also be used in communications and messages uploaded from users for distribution through the PON 200.

In the example of FIG. 2, uplink communications from the users to the optical network and downlink communications from the network to the user may illustratively have a maximum bit rate, either way, of 2488 Gbit/s. Illustratively, upstream signals may use light signals with a wavelength of 1310 nm±50 nm. If the optical fiber uses two fibers, the downstream fiber may use light signals with a wavelength of 1310 nm±50 nm. If the optical fiber uses a single fiber, the downstream fiber also uses light signals with a wavelength of 1490 nm±50 nm. Light signals of other wavelengths may also be used. These details are not shown in the figures and are a matter of design choice based upon specific embodiments and applications of this disclosure. In some embodiments, up to 20 km of physical reach is contemplated from the access node, such as OLT 201, to buildings 231, 241, 251. Longer distances may be achieved through active optical networks, optical amplification of signals and other known techniques. The foregoing illustrative example may be illustrative of Gigabit PON (GPON) technology given the speeds and lambdas defined. It will be appreciated that any downstream lambda, downstream bandwidth and upstream lambda, upstream bandwidth may be used with this embodiment.

In some embodiments, the electrical signal may have a very high speed, supporting the GPON/EPON standard of up to 2.5 m Gbit/sec or Gbps or higher. It will be appreciated that this embodiment is not limited to the GPON/EPON standard and that this embodiment may be implemented using other standards as well. The wireless transceivers can be, in one example, in the frequency band of 5 GHz or 60 GHz (in the millimeter band). The wireless transceivers can be implemented in WiFi chipsets for the IEEE 802.11ac or 802.11ad standard. Speed in communications may also be assisted by using ISM (Industrial, Scientific and Medical) modems that can support very high data rates, such as WiGig at 4.7 Gbit/sec. One or more modems may be used as a PHY layer in the radio transmissions for this and for other embodiments. With wireless links, attention should be paid to quality of service (QoS) and latency indicators so as not to impact the performance, for instance, of the PON. Other normal operational aspects may also require attention. It is understood that in the present context, these services are delivered via fiber to the customer.

Once the optical network termination has reached into each home or premises, the communications may be further distributed inside as desired. Thus, an optical signal may be routed to each desired point in the home or building as the owner or user wishes. Alternatively, an optical network terminal or circuitry with similar functionality may be used to convert the incoming or downlink optical signal to an electrical signal for further distribution. In these examples, the electrical signals may then be distributed to user devices, such as telephones, computers, televisions, a switchboard, and so forth. The optical network terminal or circuitry with similar functionality may also be used for uplinks, that is, for taking electrical signals from the end-user devices in buildings 231, 241, 251 and converting them to optical signals for uplink to the optical network and a destination desired by the user.

Figure 3:
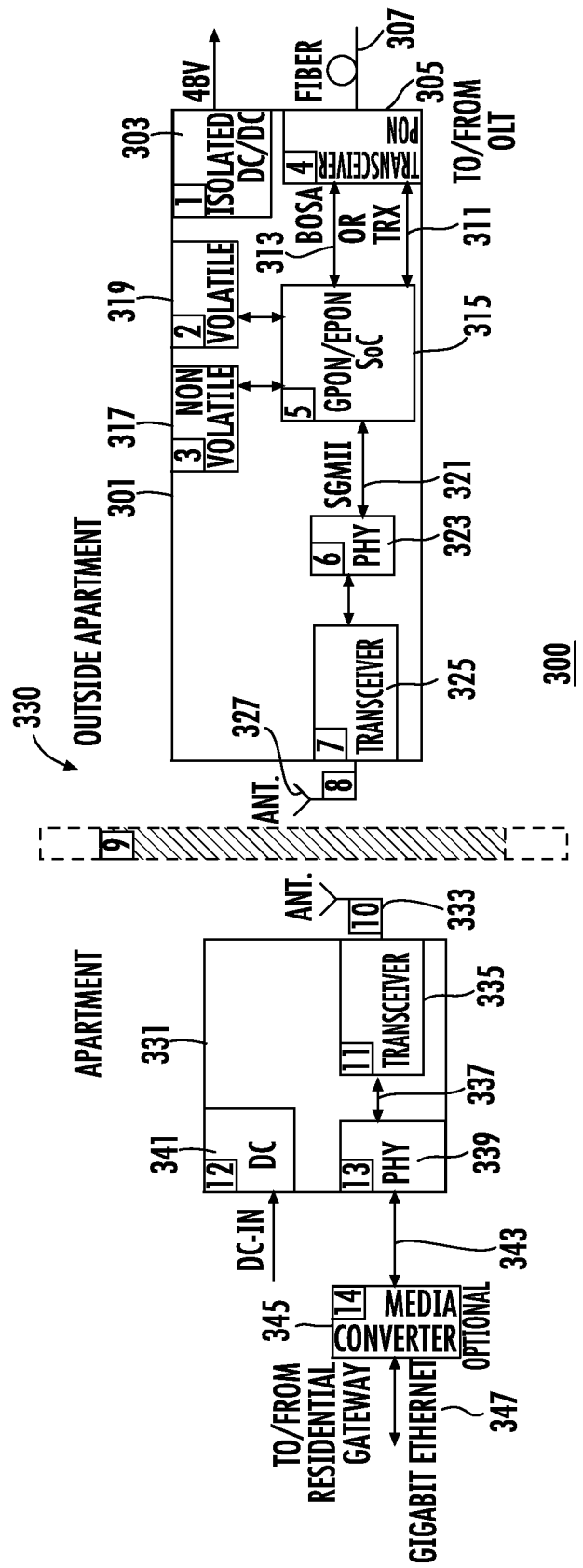
FIG. 3 is a first implementation of the embodiment of FIG. 2.

FIG. 3 depicts an illustrative embodiment of the PON 200 depicted in FIG. 2. The system 300 includes at least one optical fiber 307 coupled to an optical line termination (OLT) (not shown) of a PON. A first component box 301 is located outside a premises, such as an apartment or other building. The first component box 301 includes at least one first transceiver 325 outside the premises that is communicatively coupled to a terminal end of the at least one optical fiber 307. The at least one first transceiver 325 is configured for wirelessly transmitting to and receiving data from the PON. Wireless transmission of PON data occurs over antenna 327.

Inside the building is a second component box 331. The second component box 331 includes at least one second transceiver 335 which is located inside the building. Second transceiver 335 is configured to wirelessly transmit to and receive data from the at least one first transceiver 325, with which it is associated. Wireless transmission of PON data occurs over antenna 333.

The first component box 301 further comprises a PON system on a chip (PON SoC) 315 and a PON transceiver 305 connected thereto. A physical (PHY) layer 323 provides a physical connection between the PON SoC 315 and the first transceiver 325. The PON SoC 315 is adapted to provide an SGMII interface 321 to the PHY layer 323. The PON transceiver 305 is adapted to receive the at least one optical fiber 307. The PON SoC 315 and the PON transceiver 305 bidirectionally communicate using a bidirectional optical subassembly interface (BOSA Interface) 313 or a transceiver interface (TRX Interface) 311 or other optical interface.

The first component box 301 further comprises a memory that is illustratively selected from the group consisting of a volatile memory 319 and a non-volatile memory 317. In one embodiment, the non-volatile memory 317 may be a random access memory (RAM) chip, such as DDR2 SDRAM memory (double data rate synchronous dynamic RAM). The volatile memory 319 may be flash memory, such as an EEPROM. Other types of memories may also be used.

The first component box 301 further comprises a power source 303 which may be a DC/DC isolated power source. The power source 303 may also be powered by an AC-to-DC converter. Power source 303 may receive power from an outside source, such as 48 VDC or other suitable voltage, and convert the power to voltages or forms suitable for use inside the terminal, such as 5 VDC, 3.3 VDC, or as desired. Power to the terminals may be supplied in other ways, such as one or more batteries, with any needed changes in voltage provided by an on-board DC/DC converter or other power supply circuit.

While a Serial Gigabit Media Independent Interface (SGMII) 321 and a physical (PHY) layer 323 are shown, it will be appreciated that any PHY/MAC interface may be employed to provide the bidirectional communication between the at least one first transceiver 325 and the PON transceiver 305.

The second component box 331 further comprises a power source 341 which may be a DC/DC isolated power source. The power source 341 may also be powered by an AC-to-DC converter. The second component box 331 further comprises a physical (PHY) layer 339 for physically connecting the second transceiver 335 via connection 337 to a user interface (233, 243, 253 in FIG. 2), a module for implementing a radio frequency (RF) to Ethernet conversion (238, 248, 258 in FIG. 2), and a module for implementing a gateway interface (237, 247, 257 in FIG. 2). The module for implementing the user interface, the module for implementing RF to Ethernet conversion, and the module for implementing a gateway interface to accommodate different user residential gateways with interfaces such as POTS 261, 100BaseT 263, 1000BaseT 269, IP-Video 265, PABX 267, and so on are as previously described in FIG. 2. An optional media converter 345 (which is connected to the second component box 331 via connection 343) may be provided to provide further functionality to convert PON data to other media formats, which may then be sent to a residential gateway via Gigabit Ethernet 347.

Advantageously, the first and second associated transceiver pairs of this embodiment allow PON data to be bi-directionally transmitted wirelessly across partition 330. This avoids the need for the optical fiber 307 to have to pass through the partition 330 at great cost of time and expense to the provider to implement.

Note that some PHY interfaces or layers may take the form of an integrated circuit or chip to effect the transformation of a signal. These may include a chip for a PCI-e (peripheral component interconnect express) PHY interface or layer. A chip may be used as a PHY layer for other interfaces or layers, such as for an Ethernet PHY layer, a USB PHY chip, an SDRAM chip for non-volatile memory, a flash memory chip interface for volatile memory, and so forth.

Figure 4:
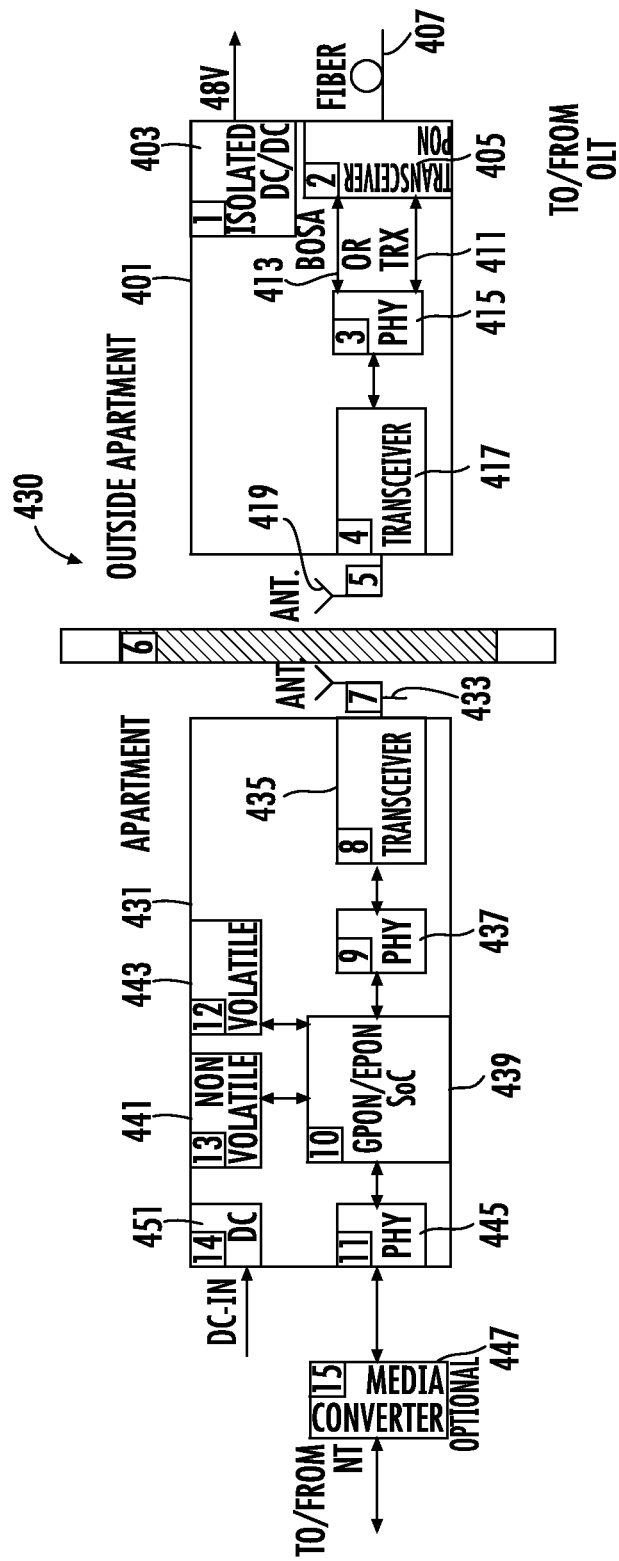
FIG. 4 is a second implementation of the embodiment of FIG. 2.

FIG. 4 is a second implementation of the embodiment of FIG. 2. The system 400 includes at least one optical fiber 407 coupled to an optical line termination (OLT) (not shown) of a PON. A first component box 401 is located outside a building, such as an apartment. The first component box 401 includes at least one first transceiver 417 outside the building that is communicatively coupled to a terminal end of the at least one optical fiber 407. The at least one first transceiver 417 is configured for wirelessly transmitting to and receiving data from the PON. Wireless transmission of PON data occurs over antenna 419.

Inside the building is a second component box 431. The second component box 431 includes at least one second transceiver 435 which is located inside the building. Second transceiver 435 is configured to wirelessly transmit to and receive data from the at least one first transceiver 417, with which it is associated. Wireless transmission of PON data occurs over antenna 433.

The first component box 401 further comprises a PON transceiver 405 connected thereto. A physical (PHY) layer 415 provides a physical connection between the transceiver 417 and the PON transceiver 405. The PHY layer 415 and the PON transceiver 405 bi-directionally communicate using a bidirectional optical subassembly interface (BOSA Interface) 413 or a transceiver interface (TRX Interface) 411 or other optical interface. The PON transceiver 405 is adapted to receive the at least one optical fiber 407. The first component box 401 further comprises a power source 403 which may be a DC/DC isolated power source. The power source 403 may also be powered by an AC-to-DC converter.

The second component box 431 further comprises a PON system on a chip (PON SoC) 439 and transceiver physical (PHY) layers 437, 445. Transceiver PHY layer 437 provides a physical connection between the PON SoC 439 and the transceiver 435. The second component box 431, also known as an inside terminal, includes memory accessible to the PON SoC 439, memory that is illustratively selected from the group consisting of a volatile memory 443 and a non-volatile memory 441.

Transceiver PHY layer 445 provides a physical connection between the PON SoC 439 and a user interface (233, 243, 253 in FIG. 2), a module for implementing a RF to Ethernet conversion (238, 248, 258 in FIG. 2), and a module for implementing a gateway interface (237, 247, 257 in FIG. 2). The module for implementing the user interface, the module for implementing a RF to Ethernet conversion, and the module for implementing a gateway interface to accommodate different user residential gateways with interfaces such as POTS 261, 100BaseT 263, 1000BaseT 269, IP-Video 265, PABX 267, and so on are as previously described in FIG. 2. An optional media converter 447 may be provided to provide further functionality to convert PON data to other media formats. The second component box 431 further comprises a power source 451 which may be a DC/DC isolated power source.

Advantageously, the first and second associated transceiver pairs of this disclosure allow PON data to be bi-directionally transmitted wirelessly across partition 430. This avoids the need for the optical fiber 407 to have to pass through the partition 430 at great cost of time and expense to the provider to implement.

Figure 5:
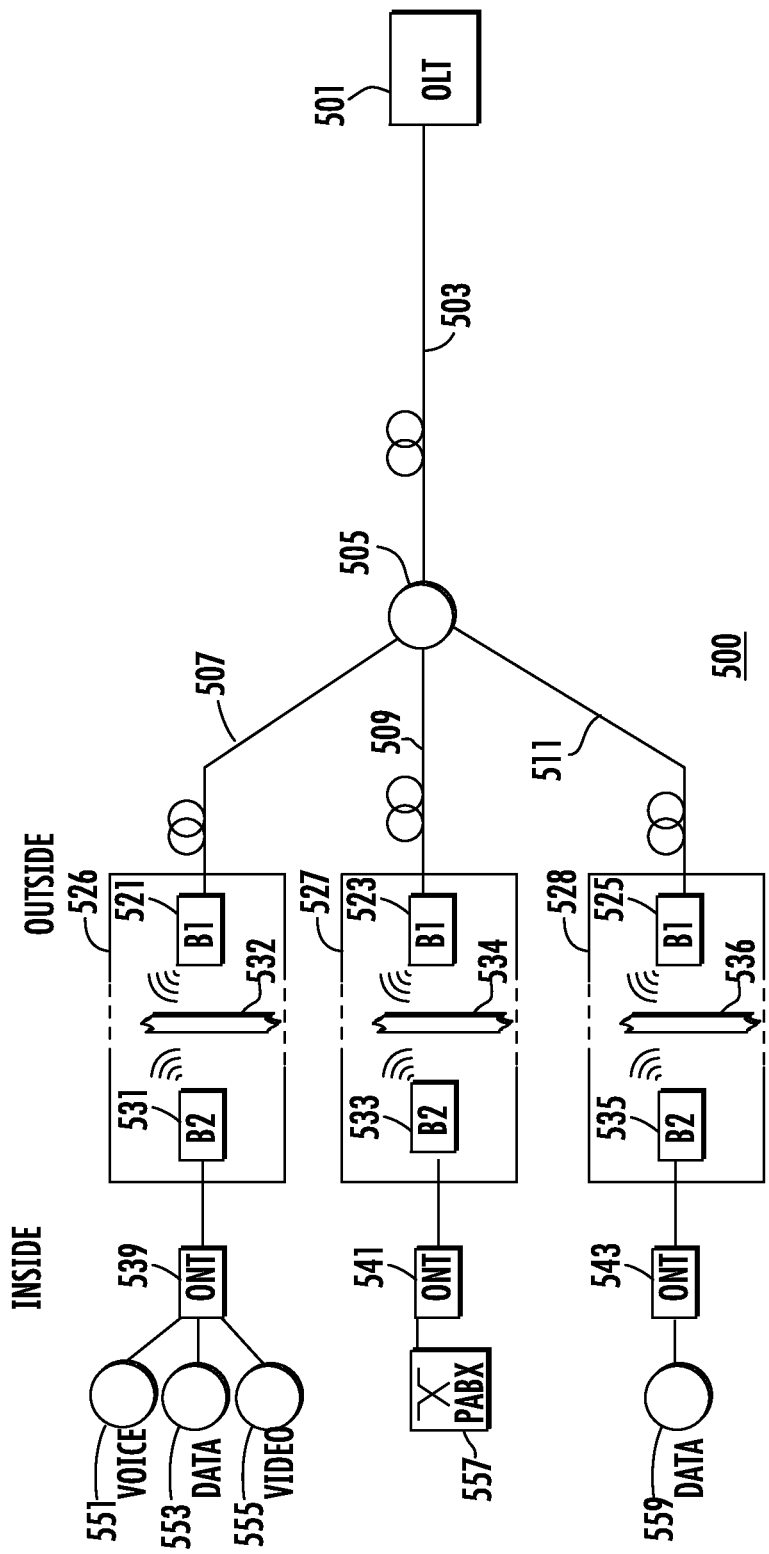
FIG. 5 is an embodiment of an illustrative second system architecture of this disclosure.

FIG. 5 is an alternative embodiment of an illustrative second system architecture. Passive optical network (PON) 500 includes an optical line termination (OLT) 501 of the PON 500 outside a building, an optical network terminal (ONT) 539, 541, 543 the PON 500 inside the building and a wireless bridge 526, 527, 528 disposed between the OLT 501 and the ONT 539, 541, 543. The wireless bridge 526, 527, 528 includes at least one first transceiver 521, 523, 525 outside the building communicatively coupled to the OLT 501 and configured for wirelessly transmitting and receiving data from the PON 500 and at least one second transceiver 531, 533, 535 communicatively coupled to the ONT 539, 541, 543 and configured to wirelessly transmit and receive data from the at least one first transceiver 521, 323, 525.

The OLT 501 provides network access via an optical fiber 503 to a splitter/combiner 505, similar to the splitter/combiner previously discussed. On the downlink path, the splitter/combiner 505 splits the signals on optical fiber 503 into three signals, one applied to each separate optical fiber 507, 509, 511. On the uplink path, the splitter/combiner 505 combines the signals on optical fibers 507, 509, 511 into a single channel on optical fiber 503 for transmission to the OLT 501.

The ONT 539, 541, 543 provides a user interface (233, 243, 253 in FIG. 2), a module for implementing a RF to Ethernet conversion (238, 248, 258 in FIG. 2), and a module for implementing a gateway interface (237, 247, 257 in FIG. 2). The module for implementing the user interface, the module for implementing a RF to Ethernet conversion, and the module for implementing a gateway interface to accommodate different user residential gateways with interfaces such as POTS 261, 100BaseT 263, 1000BaseT 269, IP-Video 265, PABX 267, and so on are as previously described in FIG. 2. More specifically, in FIG. 5, ONT 539 is depicted with a POTS 551 interface, 100BaseT 553 interface, and IP-Video 555 interface; ONT 541 is depicted with a PABX 557 interface; and ONT 543 is depicted with a 1000BaseT 559 interface.

Advantageously, the associated pair of first transceivers 521, 523, 525 and second transceivers 531, 533, 535 allow PON data to be bi-directionally transmitted wirelessly across partitions 532, 534, 536. This avoids the need for the optical fibers 507, 509, 511 to have to pass through partitions 532, 534, 536 at great cost of time and expense to the provider to implement.

Figure 6:
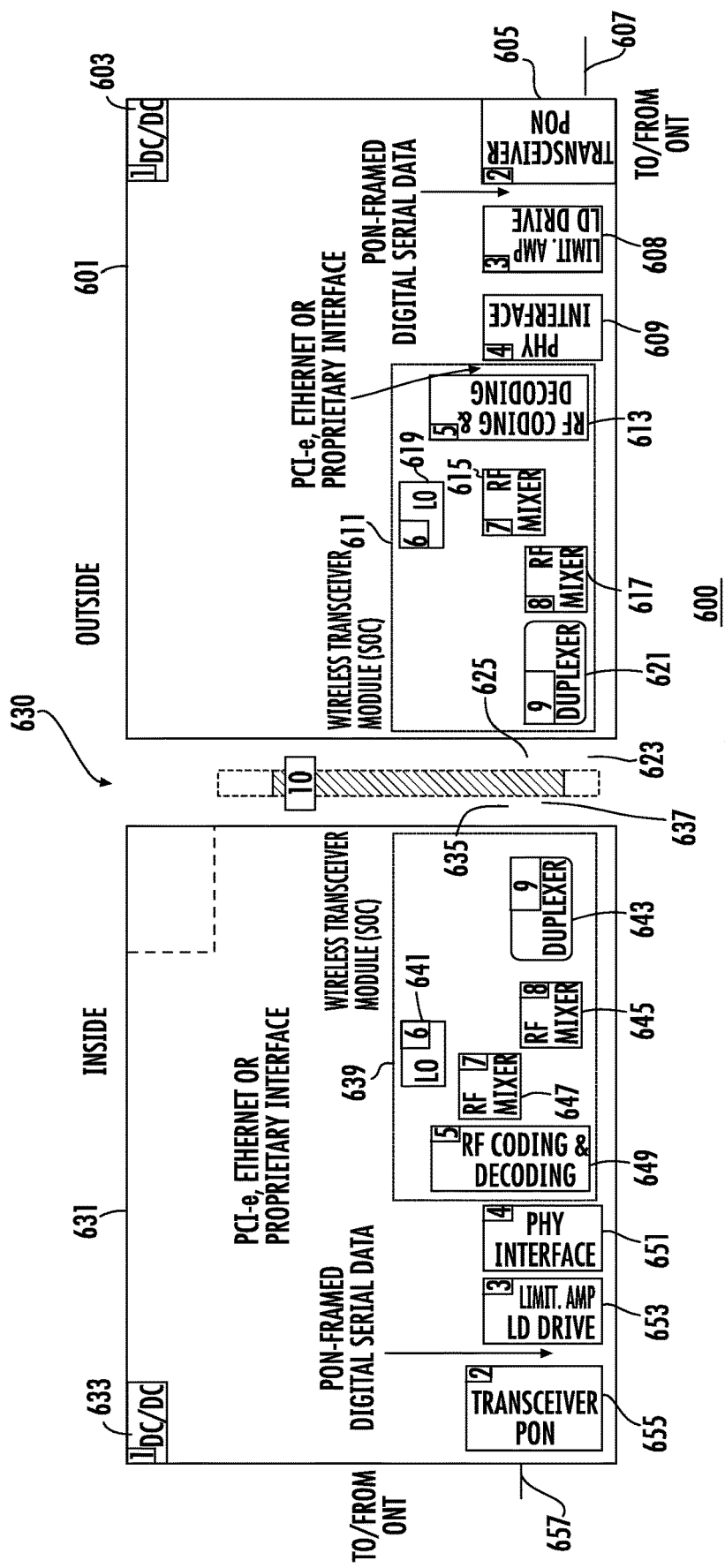
FIG. 6 is an implementation of the embodiment of FIG. 5.

FIG. 6 is an implementation of the embodiment of FIG. 5. A first component box 601 is located outside a building. The first component box 601 includes at least one first transceiver 611 outside the building that is communicatively coupled to a terminal end of at least one optical fiber 607. The at least one first transceiver 611 is configured for wirelessly transmitting to and receiving data from the PON. Wireless transmission occurs via path 623 and antenna 625.

Inside the building is a second component box 631. The second component box 631 includes at least one second transceiver 634 which is located inside the building. Second transceiver 639 is configured to wirelessly transmit to and receive data from the at least one first transceiver 611, with which it is associated. Wireless transmission occurs via path 637 and antenna 635.

Each of the first transceiver 611 and the second transceiver 639 comprises an RF codex 613, 649, respectively, which transforms an optical signal into an RF signal and vice versa. Each transceiver 611, 639 further comprises a local oscillator 619, 641, respectively, which generates a carrier frequency; two RF mixers 615, 617, 645, 647, respectively which is a circuit that mixes the frequency of the data with the carrier frequency; and a duplexer 621, 643, respectively which is a circuit that provides for bidirectional communication over the same communication link.

The first component box 601 further comprises a PON transceiver 605 connected thereto. A physical (PHY) interface layer 609 provides a physical connection between the first transceiver 611 and the PON transceiver 605. The PHY interface layer 609 and the PON transceiver 605 bi-directionally communicate with each other. A limiting amplifier and laser diode driver circuit 608 disposed between the PHY interface layer 609 and the PON transceiver 605 provide limiting amplification in the downlink direction and laser diode driver functionality in the uplink direction. The PON transceiver 605 is adapted to receive the at least one optical fiber 607.

The first component box 601 further comprises a power source 603, which may be a DC/DC isolated power source. The power source 603 may also be powered by an AC-to-DC converter.

The second component box 631 further comprises a PON transceiver 655 connected thereto. A physical (PHY) interface layer 651 provides a physical connection between the second transceiver 639 and the PON transceiver 655. The PHY interface layer 651 and the PON transceiver 655 bidirectionally communicate with each other. A limiting amplifier and laser diode driver circuit 653 disposed between the PHY interface layer 651 and the PON transceiver 655 provide limiting amplification in the uplink direction and laser diode driver functionality in the downlink direction. The PON transceiver 655 is adapted to accommodate different user residential gateways via with interfaces 657 such as POTS 261, 100BaseT 263, 1000BaseT 269, IP-Video 265, PABX 267, and so on as were previously described in FIG. 2.

The second component box 631 further comprises a power source 633 which may be a DC/DC isolated power source. The power source 633 may also be powered by an AC-to-DC converter.

Advantageously, the associated first and second transceiver pairs of this embodiment allow PON data to be bi-directionally transmitted wirelessly across partition 630. This avoids the need for the optical fiber 607 to have to pass through the partition 630 at great cost of time and expense to the provider to implement.

Figure 7:
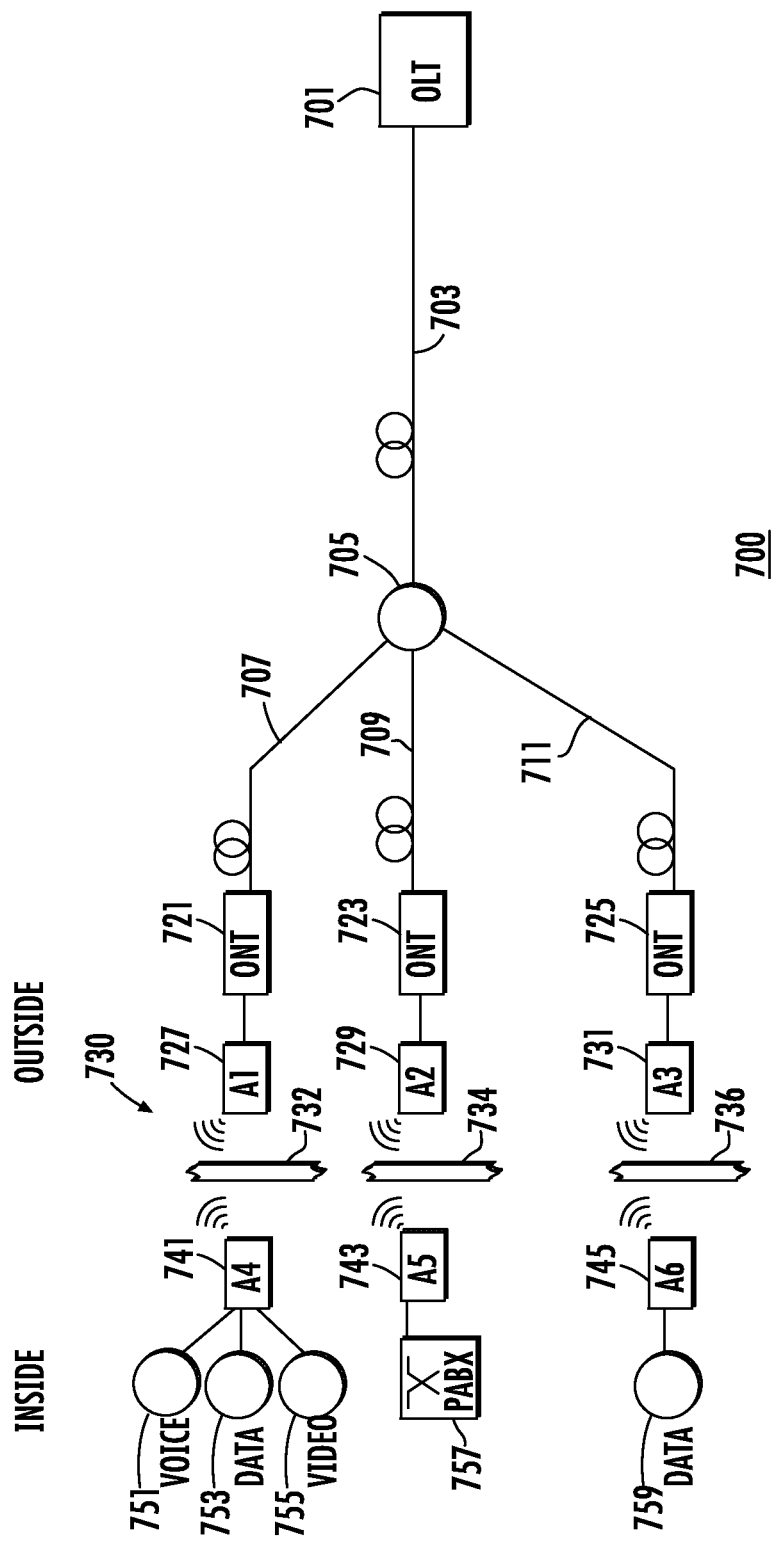
FIG. 7 is an embodiment of an illustrative third system architecture of this disclosure.

FIG. 7 is an alternate embodiment of an illustrative third system architecture disclosed herein. A PON system 700 includes an OLT 701 of a PON outside a building, an ONT 721, 723, 725 of a PON outside the building, the ONT 721, 723, 725 communicatively coupled to the OLT 701 and at least one first transceiver 727, 729, 731 outside the building communicatively coupled to the ONT 721, 723, 725, respectively, and configured for wirelessly transmitting to and receiving data from the PON 700. The PON system 700 also includes at least one second transceiver 741, 743, 745 inside the building configured to wirelessly transmit to and receive data through a wall 730 or partitions 732, 734, 736 from the at least one first transceiver 727, 729, 731, and also includes a module for implementing a user interface, a module for implementing a RF to Ethernet conversion, and a module for implementing a gateway interface. The user interface module, the RF to Ethernet conversion module and the gateway interface module are communicatively coupled to the at least one second transceiver 741, 743, 745 and configured for transmitting to and receiving data from the PON 700. The module for implementing the user interface, the module for implementing a RF to Ethernet conversion, and the module for implementing a gateway interface to accommodate different user residential gateways with interfaces such as POTS 261, 100BaseT 263, 1000BaseT 269, IP-Video 265, PABX 267, and so on are as previously described in FIG. 2. More specifically, in FIG. 7, second transceiver 741 is depicted with a POTS 751 interface, 100BaseT 753 data interface, and IP-Video 755 interface; second transceiver 743 is depicted with a PABX 757 interface; and second transceiver 745 is depicted with a 1000BaseT 759 data interface.

The OLT 701 provides network access via the optical fiber 703 to a splitter/combiner 705, similar to the splitter/combiner previously discussed. On the downlink path, the splitter/combiner 705 splits the signals on optical fiber 703 into three signals, one applied to each separate optical fiber 707, 709, 711. On the uplink path, the splitter/combiner 705 combines the signals on optical fibers 707, 709, 711 into a single channel on optical fiber 703 for transmission to the OLT 701.

Figure 8:
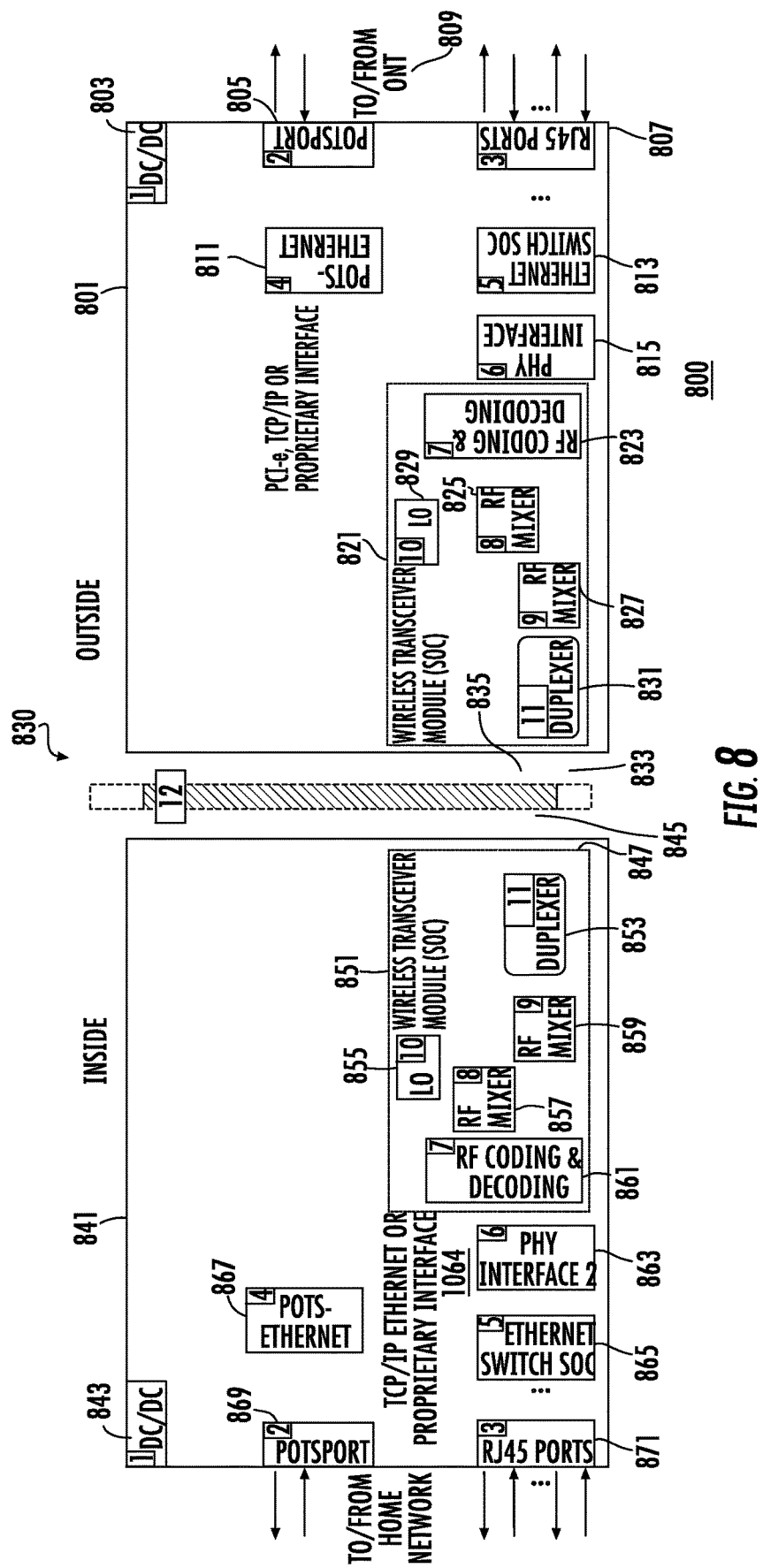
FIG. 8 is a first implementation of the embodiment of FIG. 7.

FIG. 8 is a first implementation 800 of the exemplary embodiment of FIG. 7. A first component box 801 is located outside a building. The first component box 801 includes at least one first transceiver 821 outside the building that is communicatively coupled to a terminal end of at least one optical fiber (same as in FIG. 6, 607). The at least one first transceiver 821 is configured for wirelessly transmitting to and receiving data from the PON. Wireless transmission occurs via path 833 and antenna 835.

Inside the building is a second component box 841. The second component box 841 includes at least one second transceiver 851 which is located inside the building. Second transceiver 851 is configured to wirelessly transmit to and receive data from the at least one first transceiver 821, with which it is associated. Wireless transmission occurs via path 847 and antenna 845.

Each of the first transceiver 821 and the second transceiver 851 comprises an RF codex 823, 861, respectively, which transforms an optical signal into a RF signal and vice versa. Each transceiver 821, 851 further comprises a local oscillator 829, 855, respectively, which generates a carrier frequency; two RF mixers 825, 827, 857, 859, respectively which is a circuit that mixes the frequency of the data with the carrier frequency; and a duplexer 831, 853, respectively which is a circuit that provides for bidirectional communication over the same communication link.

Each of the first component box 801 and the second component box 841 further comprises a power source 803, 843, respectively, which may be a DC/DC isolated power source. The power source 803, 843 may also be powered by an AC-to-DC converter.

Each of the first component box 801 and the second component box 841 further comprises a POTS port 805, 869 respectively, for receiving and transmitting voice signals to and from an ONT via link 809. Each of the first component box 801 and the second component box 841 further comprises a POTS to Ethernet converter 811, 867, respectively, for converting voice signals into an Ethernet format.

Each of the first component box 801 and the second component box 841 further comprises a transceiver RJ45 Port 807, 871 connected thereto. A physical (PHY) interface layer 815, 863, respectively, provides a physical connection between the transceiver 821, 851, respectively, and an Ethernet Switch System on Chip (Ethernet Switch SoC) 813, 865, respectively.

Advantageously, the Ethernet Switch SoC 813, 865 of each of the first component box 801 and the second component box 841, respectively, is in bidirectional communication with both RJ45 ports 807, 871 and the POTS to Ethernet converter 811, 867. Hence, the Ethernet Switch SoC 813, 865, respectively, in this example transforms to Ethernet format signals that originate as either data signals, voice signals or both. The RJ45 port 807 of the first component box 801 is adapted to receive the at least one optical fiber (same as in FIG. 6, 607). The RJ45 port 871 of the second component box 841 is adapted to accommodate different user residential gateways with interfaces such as POTS 261, 100BaseT 263, 1000BaseT 269, IP-Video 265, PABX 267, and so on are as previously described in FIG. 2. The POTS ports 805, 869 are adapted to receive and transmit voice signals.

Advantageously, the associated first and second transceiver pairs of this embodiment allow PON data to be bi-directionally transmitted wirelessly across partition 830. This avoids the need for the optical fiber 807 to have to pass through the partition 830 at great time and expense to the provider to implement.

Figure 9:
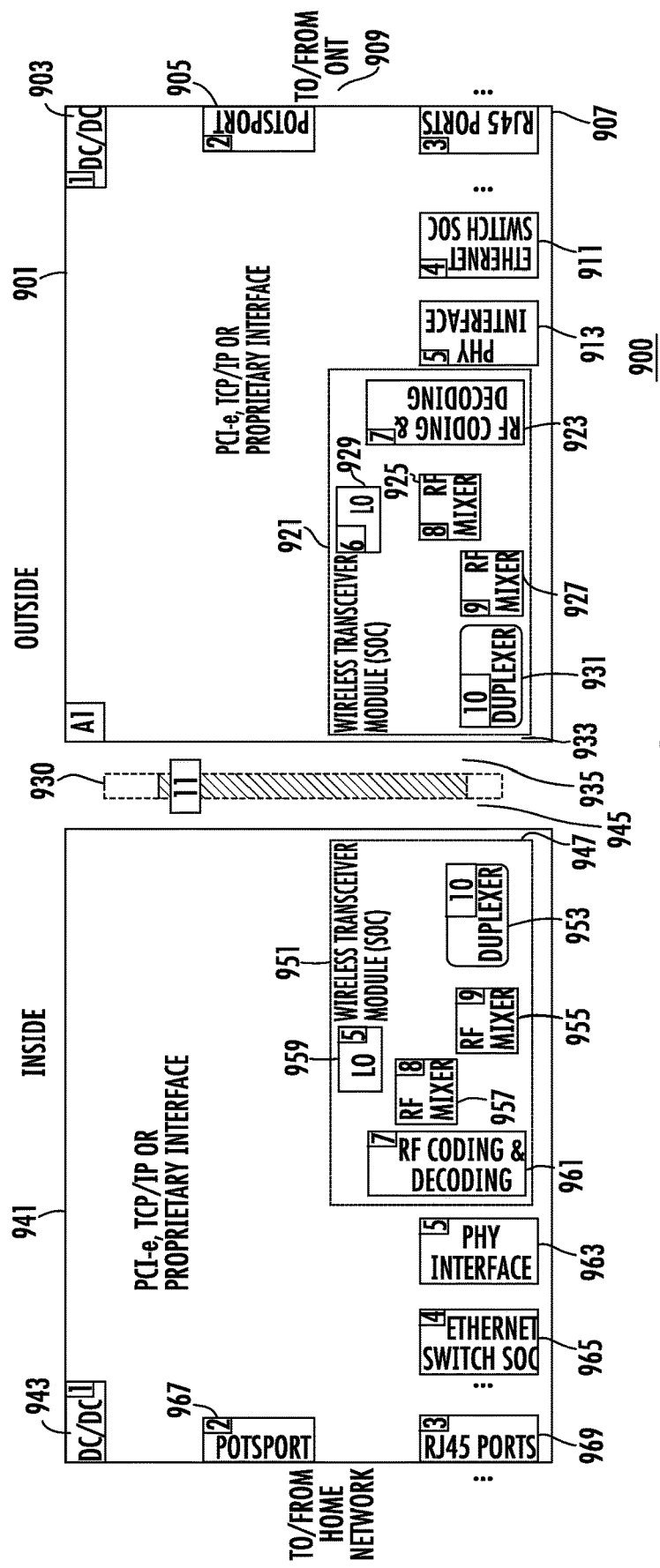
FIG. 9 is a second implementation of the embodiment of FIG. 7.

FIG. 9 is a second implementation 900 of the exemplary embodiment of FIG. 7. A first component box 901 is located outside a building. The first component box 901 includes at least one first transceiver 921 outside the building that is communicatively coupled to a terminal end of the at least one optical fiber (same as FIG. 6, 607). The at least one first transceiver 921 is configured for wirelessly transmitting to and receiving data from the PON. Wireless transmission occurs via path 933 and antenna 935.

Inside the building is a second component box 941. The second component box 941 includes at least one second transceiver 951 which is located inside the building. Second transceiver 951 is configured to wirelessly transmit to and receive data from the at least one first transceiver 921, with which it is associated. Wireless transmission occurs via path 947 and antenna 945.

Each of the first transceiver 921 and the second transceiver 951 comprises an RF codex 923, 961, respectively, which transforms an optical signal into a RF signal and vice versa. Each transceiver 921, 951 further comprises a local oscillator 929, 959, respectively, which generates a carrier frequency; two RF mixers 925, 927, 955, 957, respectively which is a circuit that mixes the frequency of the data with the carrier frequency; and a duplexer 931, 953, respectively which is a circuit that provides for bidirectional communication over the same communication link.

Each of the first component box 901 and the second component box 941 further comprises a power source 903, 943, respectively, which may be a DC/DC isolated power source. The power source 903, 943 may also be powered by an AC-to-DC converter.

Each of the first component box 901 and the second component box 941 further comprises a POTS port 905, 967 respectively, for receiving and transmitting voice signals to and from an ONT via link 909.

Each of the first component box 901 and the second component box 941 further comprises a transceiver RJ45 port 907, 969. A PHY interface layer 913, 963 provides a physical connection between the transceiver 921, 951, respectively, and an Ethernet Switch System on Chip (Ethernet Switch SoC) 911, 965, respectively.

The Ethernet Switch SoC 911, 965 is in bidirectional communication with RJ45 ports 907, 969 to transform into Ethernet format signals that originate as data signals. Advantageously, the PHY interface layer 913, 963 receives the Ethernet format signals from the Ethernet Switch SoC 911, 965, respectively, and also receives voice signals from the POTS port 905, 967, respectively. Hence, the voice signals from the POTS port 905, 967 are transformed into Ethernet format signals in the PHY interface layer 913, 963, respectively, in this example. The RJ45 port 907 is adapted to receive the at least one optical fiber (same as in FIG. 6, 607). The RJ45 port 969 is adapted to accommodate different user residential gateways with interfaces such as POTS 261, 100BaseT 263, 1000BaseT 269, IP-Video 265, PABX 267, and so on as were previously described in FIG. 2. The POTS ports 905, 967 are adapted to receive and transmit voice signals.

Advantageously, the associated first and second transceiver pairs of this embodiment allow PON data to be bi-directionally transmitted wirelessly across partition 930. This avoids the need for the optical fiber 907 to have to pass through the partition 930 at great cost of time and expense to the provider to implement.

Figure 10:
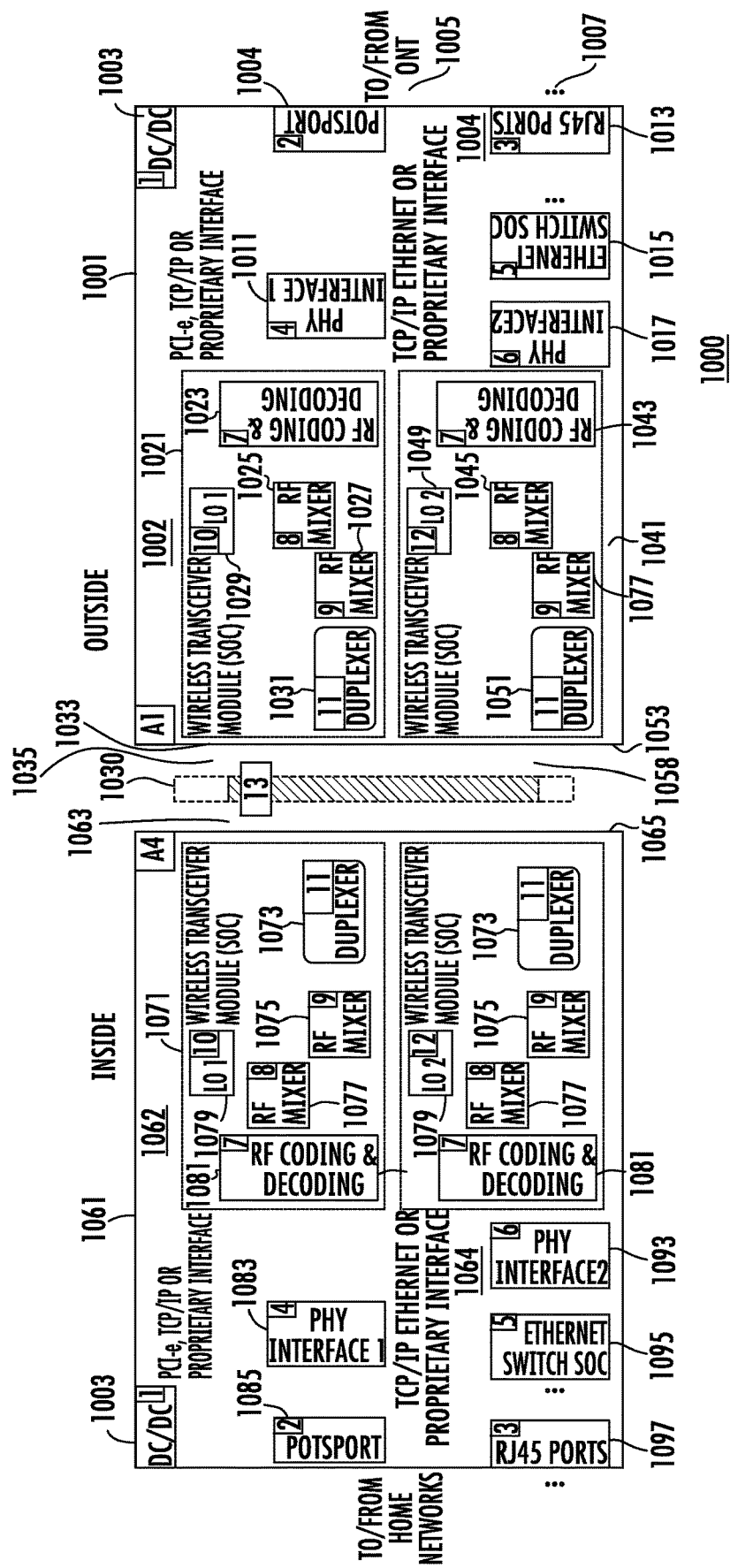
FIG. 10 is a third implementation of the embodiment of FIG. 7.

FIG. 10 is a third implementation of the exemplary embodiment of FIG. 7. A first component box 1001 is located outside a building. The component box 1001 includes at least one first transceiver 1041 outside the building that is communicatively coupled to a terminal end of at least one optical fiber 1007. The at least one first transceiver 1041 is configured for wirelessly transmitting to and receiving data from a PON. Wireless transmission occurs via path 1053 and antenna 1058.

Inside the building is a second component box 1061. The second component box 1061 includes at least one second transceiver 1091 which is located inside the building. Second transceiver 1091 is configured to wirelessly transmit to and receive data from the at least one first transceiver 1041, with which it is associated. Wireless transmission occurs via antenna 1065.

Each of the first transceiver 1041 and the second transceiver 1091 comprises an RF codex 1043, 1081, respectively, which transforms an optical signal into a RF signal and vice versa. Each transceiver 1041, 1091 further comprises local oscillators 1029, 1049, 1079, respectively, which generates a carrier frequency; two RF mixers 1045, 1047, 1075, 1077, respectively, which is a circuit that mixes the frequency of the data with the carrier frequency; and duplexers 1031, 1051, 1073, respectively which is a circuit that provides for bidirectional communication over the same communication link.

Each of the first transceiver 1041 and the second transceiver 1091 is further provided with a mirror transceiver depicted as transceivers 1021, 1071, respectively, with antenna 1035, 1063. These first and second mirror transceivers 1021, 1071, respectively have like components, functionality, and operation as counterpart transceivers 1041, 1091, respectively.

Each of the first component box 1001 and the second component box 1061 further comprises a power source 1003 which may be a DC/DC isolated power source. The power sources 1003 may also be powered by an AC-to-DC converter.

Each of the first component box 1001 and the second component box 1061 further comprises a POTS port 1004, 1085, respectively, for receiving and transmitting voice signals.

Each of the first component box 1001 and the second component box 1061 further comprises transceiver RJ45 ports 1013, 1097. A first PHY interface 1017, 1093, provides a physical connection between the transceiver 1041, 1091, respectively, and an Ethernet Switch System on Chip (Ethernet Switch SoC) 1015, 1095, respectively.

The Ethernet Switch SoC 1015, 1095 is in bidirectional communication with RJ45 ports 1013, 1097, to transform into Ethernet format signals that originate as data signals. Hence, the data signals from the RJ45 ports 1013, 1097 are transformed into Ethernet format signals by the Ethernet SoC 1015, 1095, respectively, in this example, which applies the Ethernet format signals to transceivers 1041, 1091, respectively.

A second PHY interface 1011, 1083 receives the voice signals from the POTS ports 1004, 1085, respectively. Advantageously, the second PHY interface 1011, 1083 transforms the voice signals into Ethernet format and applies the Ethernet format signals to mirror transceivers 1021, 1071, respectively.

The RJ45 port 1013 is adapted to receive the at least one optical fiber 1007. The RJ45 port 1097 is adapted to accommodate different user residential gateways with interfaces such as POTS 261, 100BaseT 263, 1000BaseT 269, IP-Video 265, PABX 267, and so on as were previously described in FIG. 2. The POTS ports 1004, 1085 are adapted to receive and transmit voice signals.

Advantageously, the associated first and second transceiver pairs and associated mirror transceivers of this embodiment allow PON data to be bi-directionally transmitted wirelessly across partition 1030. This avoids the need for the optical fiber 1007 to have to pass through the partition 1030 at great cost of time and expense to the provider to implement.

Figure 11:
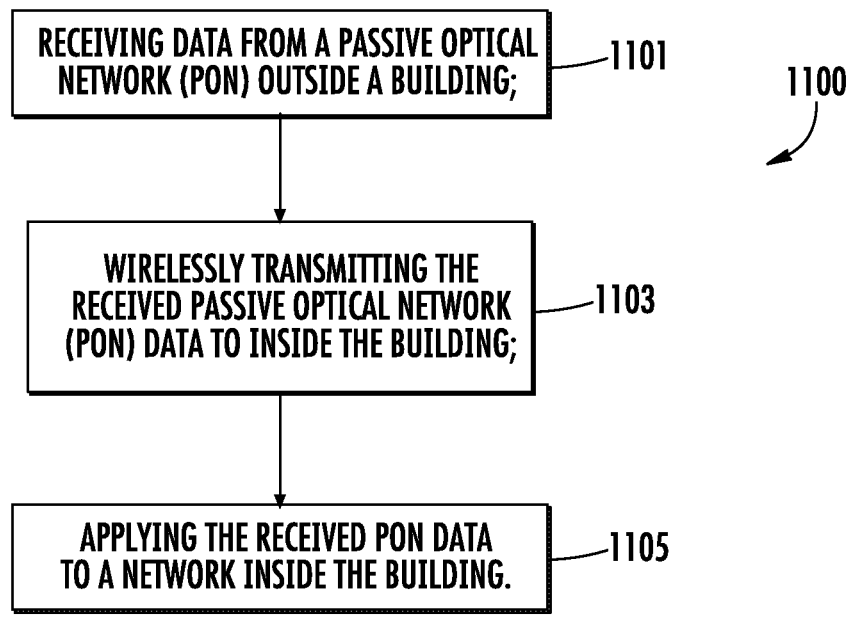
FIG. 11 is a flowchart for a method according to the present disclosure.

FIG. 11 is a flowchart 1100 for a method according to the embodiments disclosed herein. The method includes receiving data from a passive optical network (PON) outside a building (block 101), wirelessly transmitting the received PON data to inside the building (block 1103), and applying the received PON data to a network inside the building (block 1105). In one embodiment, the data received outside the building is from an optical line terminal (OLT). In an alternative embodiment, the PON data wirelessly transmitted inside the building is applied to an optical network terminal (ONT) inside the building. In still another embodiment, the method includes a step of applying the PON data to a user interface inside the building. In other embodiments, the method includes a step of applying the PON data to a gateway interface inside the building.

In another embodiment, the method includes converting the wirelessly received PON data inside the building to Ethernet format. In another method, there is a step of receiving the PON data from an FTTX deployment of the PON. In this embodiment, the FTTX deployment is selected from the group consisting of fiber-to-the-home (FTTH), fiber-to-the-business or building (FTTB), fiber-to-the-node (FTTN), fiber-to-the-curb or cabinet (FTTC), and fiber-to-the-premises (FTTP). In still another embodiment, the method includes steps of mounting the first transceiver on a surface outside the building selected from the group consisting of a corridor, a window, a door, a wall and a façade and mounting the second transceiver on a surface inside the building selected from the group consisting of a corridor, a window, a door, a wall and a façade.

There is thus disclosed systems and methods that provide for more convenient and lower cost installation and deployment of a fiber optic communications system. The systems and method disclosed herein enjoy many advantages over the prior art. No through penetration of a wall or other physical access inside a customer's building or premises is required. This avoids the necessity of authorization or approval for a penetration from a homeowner, landlord, owner association, security committee, committee of public safety, or other authority. An installer or owner can securely place the devices on a wall or a window of a building without a costly authorization or installation process. Since no physical access or modification is needed, the subscribers, users or customers will not be inconvenienced by waiting for an installation crew. There will also be no noise, dust or other hazard associated with the installation. The systems and methods disclosed herein work transparently to the user and to the communications network. Two-way communications are also enabled in the systems and methods according to the embodiments disclosed herein.

Depending on the embodiment and implementation used, the wireless bridge across the barrier may be completely transparent to the user and to the network provider. The wireless connection functions as a seamless bridge within the links of the fiber-optic based passive optical network (PON). The solution works well in all traditional FTTX deployments scenarios that use traditional optical network terminals and optical line terminations or both. Depending on the embodiment and implementation used, a PON protocol and SoC for PON networks may be avoided. Thus, only standard interfaces, such as for POTS, Ethernet, and the like, may be required for quick installation and robust service. Accordingly, relatively small and light-weight devices may be suitable for the outside terminal and the mating inside terminal. Correspondingly low power consumption may also be possible, making the use of batteries possible rather than requiring power supplies for each terminal. As noted above, the communications services available may include broadband, and thus broadband capabilities of both fiber-optic and 5 GHz or millimeter-wave wireless technology may be used herein.

One issue that sometimes may affect the efficient transmission of signals into a building is that the signals may experience loss as they pass through the walls of a building, especially when they pass through heavy concrete walls with embedded metal walls as used in many modern office and apartment buildings. Another embodiment is disclosed to improve the signal transmission. In this embodiment, a system is disclosed that uses a transparent wireless bridge on a window of a building such that signals are transmitted through one or more existing windows of the building rather than through the walls of the building. In one embodiment, a transparent wireless bridge may be used in conjunction with a wireless drop.

In one embodiment of such a system, a wireless transmitter is located on the outer wall of a building, such as a house, office, or MDU. A wireless receiver is located inside the house, office, or MDU. As one non-limiting example, the wireless transmitter and the wireless receiver may be a WLAN 802.11AC transmitter or receiver, where WLAN 802.11AC is consistent with any known WLAN 802.11AC, including but not limited to the WLAN 802.11AC standard as of the time of filing of this application. One or more thin glass foils or sheets may be attached to an existing window of the house, building, or MDU. In one embodiment, the one or more thin glass foils may be Corning Willow Glass.

Each of the one or more glass foils (also known as "sheets") contains a printed or laminated antenna. As one non-limiting example, the antenna may be an antenna working at five GigaHertz (5 GHz) to support WLAN 802.11AC. The antenna may be made of a transparent conductor, such as Indium tin oxide, a thin layer of copper, or the like. Basically, any conductor can be used that is transparent enough for keeping the glass transparent enough to be integrated with clear substrates like windows so that a view into and out of the window is not unduly obstructed. Together, the wireless transmitter, the wireless receiver, and the one or more glass foils with a printed or laminated antenna can be referred to as a transparent wireless bridge.

In addition, the system may include a transformer on both glass sheets to provide transparent power transfer. By using a transformer on both glass sheets, wireless powering over the window can be implemented, where there is reverse power feeding from the internal wireless transceiver unit (wireless receiver) to the external wireless transceiver unit (wireless transmitter) over the window.

The transparent wireless bridge described herein has several benefits, as it provides better signal path loss (less loss) and better throughput for signals as the signals pass through the window of the building easier and better than signals pass through the walls of a building, especially heavy concrete walls with embedded metal walls as used in many modern office and apartment buildings. In addition, the fact that the transparent wireless bridge described herein uses a transparent antenna printed or laminated on a flexible glass foil means that bulky boxes are not required to be placed on the sides of buildings. The printed or laminated antenna does not interfere with visibility through the window and at the same time allows easier outdoor and indoor installation. In addition, the transparent wireless bridge disclosed herein can provide wireless powering through the window which will save by using fiber only instead of composite cable. The disclosed system using the transparent wireless bridge offers improved signal path loss with less RF power being transmitted. The DC power necessary can also be reduced as part of the wireless powering provided by the transparent wireless bridge. The wireless powering also helps reduce or eliminate the composite cable, which will save cost since using solely optical fiber is cheaper than composite cable. Providing the transparent wireless bridge as part of a wireless drop solution offers similar advantages and provides a transparent solution for RF and power (wireless backhaul instead of fiber).

Figure 12:
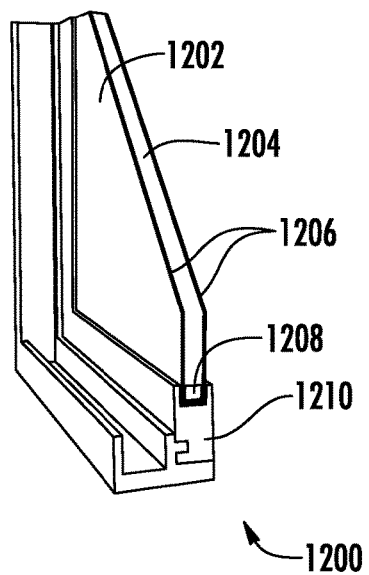
FIG. 12 is an exemplary window in which a transparent wireless power bridge according to one embodiment can be implemented.

As disclosed herein, a transparent wireless and power bridge can be implemented on a standard window. An example of a standard window can be found in FIG. 12. The exemplary window 1200 in FIG. 12 comprises a double-pane, low-e coated, soda-lime insulating glass 1202. In one embodiment, the glass 1202 may have insulation 1204 in between double panes 1206, with a spacer 1208 in between the double panes 1206 and a sill 1210. In one embodiment, the double panes 1206 may each be approximately three to four millimeters (3-4 mm) thick and have approximately twelve millimeters (12 mm) of argon gas fill or air as insulation. However, other types of windows with different number of panes and thickness may also be used with the transparent wireless bridge described herein.

As described above, one of the challenges for FTTX solutions (or other wireless solutions) is to penetrate the building or dwelling with sufficient quality of signal (i.e., the signals must have a high enough signal to noise ratio (SNR) to guarantee a good Quality of Service (QoS). Since many of the existing house and building walls are made of concrete and metal rods, in some cases the transmitted signal will be attenuated to an insufficient level. The transparent wireless bridge disclosed herein allows for transmitting of signals through a window in the building or dwelling using the transparent wireless and power bridge.

Figure 13:
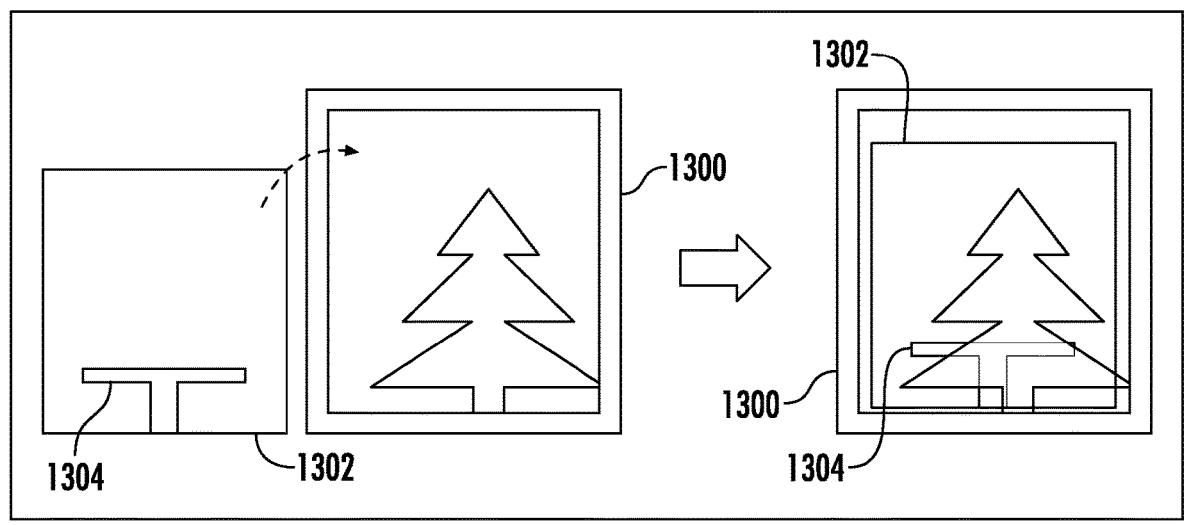
FIG. 13 is a schematic illustrating an exemplary glass sheet with a printed antenna being placed on a window without negatively affecting visibility according to one embodiment.

The transparent wireless bridge disclosed herein with a printed or laminated antenna does not interfere with visibility through the window and at the same time allows easier outdoor and indoor installation Referring now to FIG. 13, a glass foil 1302 having a printed antenna 1304 may be placed on a window 1300 without negatively affecting visibility. As seen in FIG. 13, even after the glass foil 1302 with the printed antenna 1304 is placed on the window 1300, the tree that was visible through the window 1300 before the glass foil 1302 was placed on the window is still visible.

FIGS. 14A and 14B illustrate an exemplary embodiment of a high level solution including an exemplary wireless transparent bridge. The wireless transparent bridge shown in FIGS. 14A and 14B may be used in place of the wireless bridges 526, 527, 528 disposed between the OLT 501 and the ONT 539, 541, 543 in FIG. 5.

FIG. 14A is a front view of an exemplary wireless bridge implemented in a window 1400 of a building. One or more thin glass sheets 1402 and 1404 with printed or laminated antennas 1403, 1407 are located on both sides of the window 1400. In one embodiment, a first thin glass sheet 1402 with a printed or laminated antenna 1403 is located on an inner side of the window 1400 and a second thin glass sheet 1404 with a printed or laminated antenna 1407 is located on an outer side of the window 1400. The first thin glass 1402 and second thin glass 1404 may each also have an inductive element such a coil 1401 and coil 1405, respectively, for providing reverse powering through magnetic coupling in one embodiment, as will be discussed in more detail later. In one embodiment, the two thin glass sheets 1402 and 1404 may be Corning Willow Glass. The thin glass sheet 1404 on the outer side of the window may be communicatively coupled via connection 1406 to a first transceiver 1408 located on an outer wall of the building. Although only one first transceiver 1408 is shown in FIG. 14A, there may be multiple first transceivers located on the outside of the building in other embodiments.

Still referring to FIG. 14A, the first transceiver 1408 is configured to both transmit and receive data, which may be in the form of communication signals, such as RF communication signals. The first transceiver 1408 may transmit and receive communication signals at any appropriate frequency. In one embodiment, the first transceiver 1408 may transmit and receive communication signals at five GigaHertz (5 GHz). In addition, the first transceiver 1408 may also be configured to provide power to the antenna 1407 on the thin glass sheet 1404 via the connection 1406. In one embodiment, the first transceiver 1408 may be a WLAN 802.11AC transceiver. In this manner, the first transceiver 1408 provides both RF signals and power via the connection 1406. In one embodiment, the connection 1406 may be a copper cable, where the copper cable carries RF communication signals and AC or DC power. The first transceiver 1408 may also be connected to an optical fiber network (not shown) via fiber 1410 and is configured to receive and transmit communication signals to and from the optical fiber network via the fiber 1410.

Referring now to FIG. 14B, which is a side view of the exemplary wireless bridge of FIG. 14B, it can be seen that the window 1400 is located in a wall 1412 of a building. The first transceiver 1408 is located on the wall 1412, and in an exemplary embodiment may be affixed or attached to the wall 1412 via any known method. As discussed above, the first transceiver 1408 may be communicatively coupled via connection 1406 to the thin glass sheet 1404 with a printed or laminated antenna 1407 located on the outer side of the window 1400. As seen in FIG. 14B, a connection 1414 communicatively couples the thin glass sheet 1402 on the inner side of the window 1400 to a second transceiver 1416. Although only one second transceiver 1416 is shown in FIG. 14A, there may be multiple second transceivers located on the inside of the building in other embodiments. Like the first transceiver 1408, the second transceiver 1416 is configured to both transmit and receive communication signals, such as RF communication signals. The second transceiver 1416 may transmit and receive communication signals at any appropriate frequency. In one embodiment, the second transceiver 1416 may transmit and receive communication signals at five GigaHertz (5 GHz). In addition, the second transceiver 1408 may also be configured to provide power to the antenna 1403 on the thin glass sheet 1402 via the connection 1414. In one embodiment, the second transceiver 1416 may be a WLAN 802.11AC transceiver. In this manner, the second transceiver 1416 provides both RF signals and power via the connection 1414 to the antenna 1403 on the thin glass sheet 1402. In one embodiment, the connection 1414 may be a copper cable, where the copper cable carries RF communication signals and AC or DC power.

The first transceiver 1408 may transmit and receive communication signals to and from the second transceiver 1416 through the window 1400 via the two thin glass sheets 1402 and 1404 with printed or laminated antennas 1403, 1407 without having to transmit communication signals through the wall 1412. This avoids the need for having to run optical fibers through the wall 1412 into the building at great time and expense to the provider to implement. In addition, transmitting communication signals to and from the second transceiver 1416 through the window 1400 allows for better transmission of communication signals, resulting in better SNR and less signal loss.

As one example of how the transparent wireless bridge shown in FIGS. 14A and 14B transmits communication signals through a window into a building, the first transceiver 1408 may receive communication signals, such as RF signals, from an optical fiber network via fiber 1410. In one embodiment, the first transceiver 1408 may be coupled to an optical line termination (OLT) of a PON (such as the OLTs described herein) and may receive communication signals, such as RF signals, from the OLT. The first transceiver 1408 may then transmit the communication signals to the antenna 1407 on the thin glass sheet 1404 on the outer surface of the window 1400 via the connection 1406. The antenna 1407 on the thin glass sheet 1404 may then wirelessly communicate the communication signals to the antenna 1403 on the thin glass sheet 1402 on the inner surface of the window 1400. The antenna 1403 on the thin glass sheet 1402 may then transmit the communication signals to the second transceiver 1416 via the connection 1414. The second transceiver 1416 may then transmit the communication signals wirelessly to any device or network (not shown) in the building. Likewise, since both the first and second transceivers 1408, 1416 can transmit and receive signals, the transmission and receiving of signals may be bidirectional. That is, signals can be sent from devices inside the building to the optical fiber network by transmitting them to the second transceiver 1416, which may then send them to the first transceiver 1408 via the antennas 1403, 1407 on the thin glass sheets 1402, 1404. The first transceiver 1408 can then communicate the signals via the fiber 1410 to the optical fiber network.

In addition, although the solution shown in FIGS. 14A and 14B has fiber backhaul (via fiber 1410), it would also be possible to have wireless backhaul. In this wireless backhaul configuration, the first and second transceivers 1408, 1416 will behave like wireless repeaters.

The transparent antennas 1403, 1407 on the thin glass sheets 1402, 1404 can be any type of antenna design. In one embodiment, using a thin and mesh copper layer will maintain transparency of the antenna over the window.

Figure 15A:
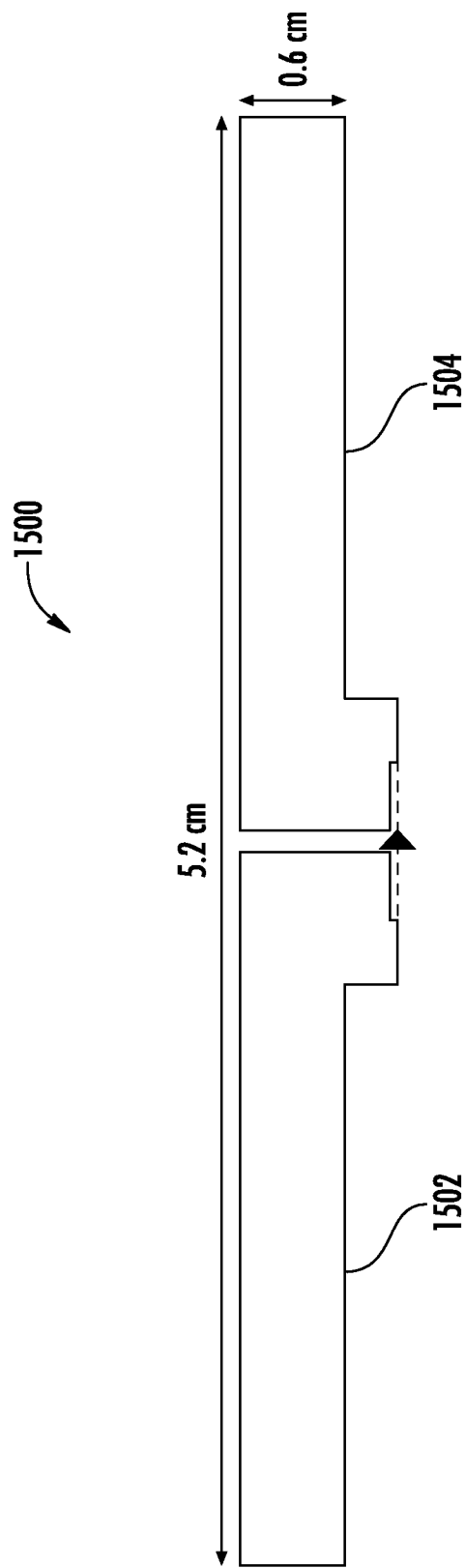
FIG. 15A depicts an exemplary dipole antenna that may be printed or laminated on a glass sheet according to one embodiment.

FIG. 15A depicts an exemplary antenna 1500 that may be printed or laminated on the thin glass sheets 1402 and 1404. In one embodiment, the antenna 1500 may comprise a 5 GHz dipole antenna for SLG (Soda Lime Glass) two-pane composite glass, $\varepsilon=6$, tan $\delta=0.02$ at 2.45G. The antenna 1500 may be a dipole antenna comprising a first antenna element 1502 and a second antenna element 1504. The antenna 1500 may be approximately 5.2 centimeters (cm) in length and have a width of approximately 0.6 cm. However, various types of antenna can be implemented.

Figure 15B:
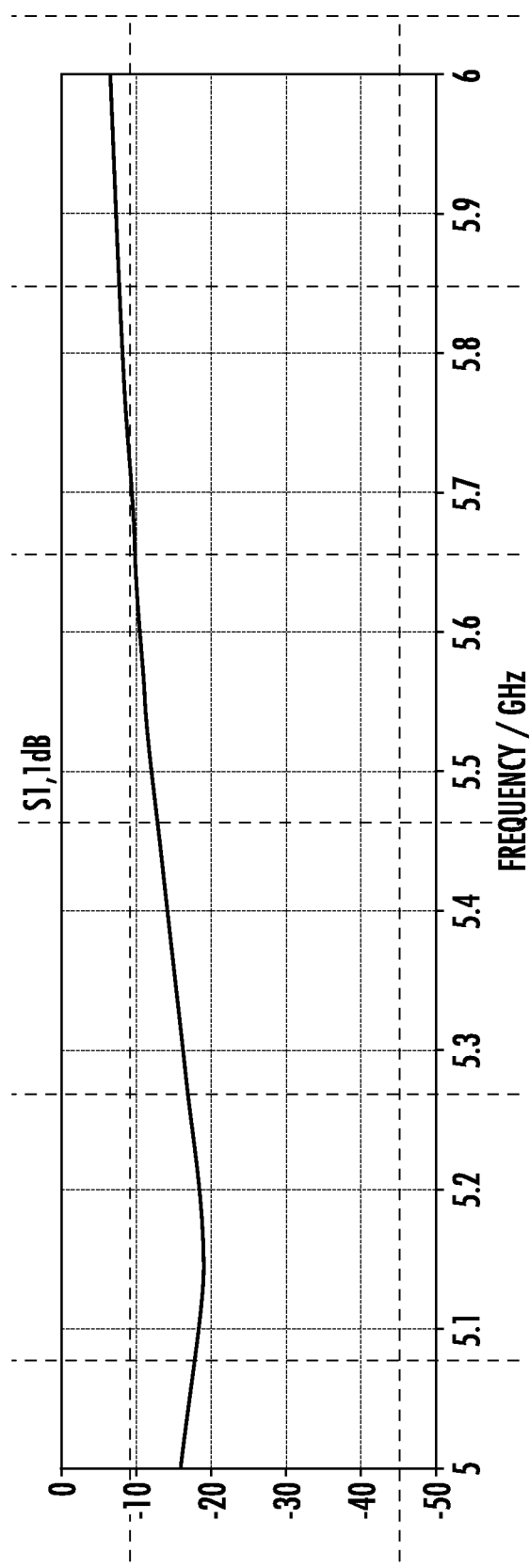
FIGS. 15B and 15C are graphs illustrating the performance of the dipole antenna of FIG. 15A.
Figure 15C:
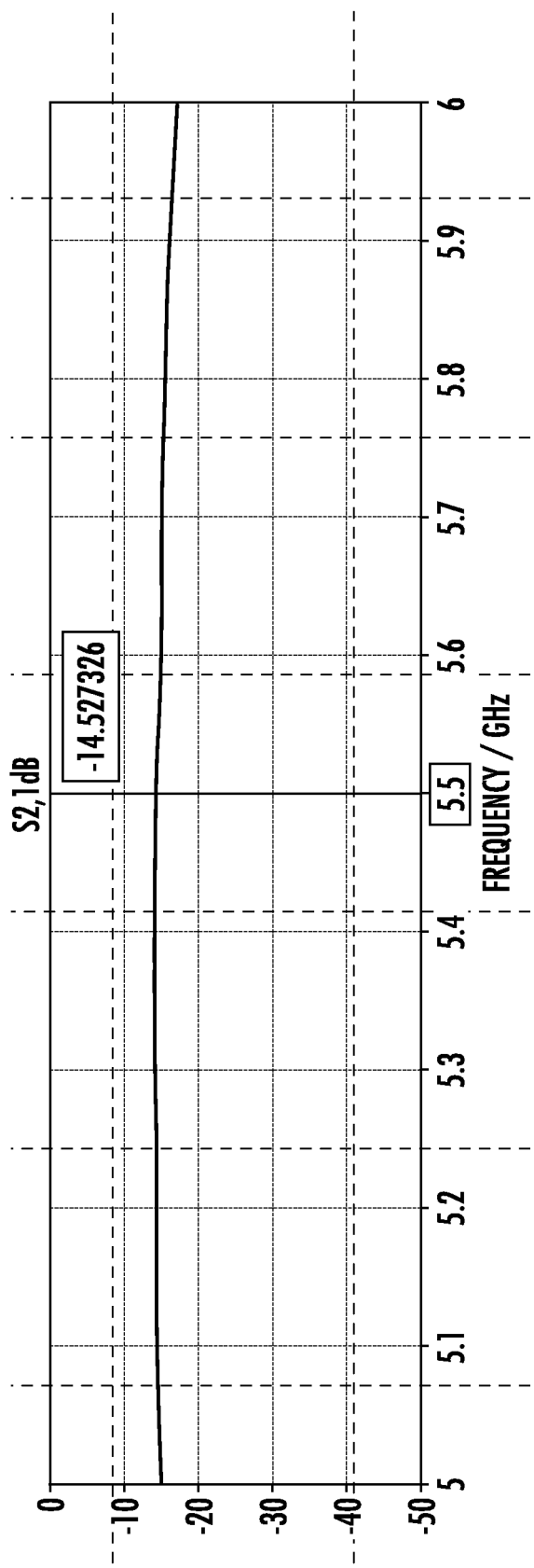

FIGS. 15B and 15C are graphs illustrating the performance of the dipole antenna 1500 of FIG. 15A.

Figure 16:
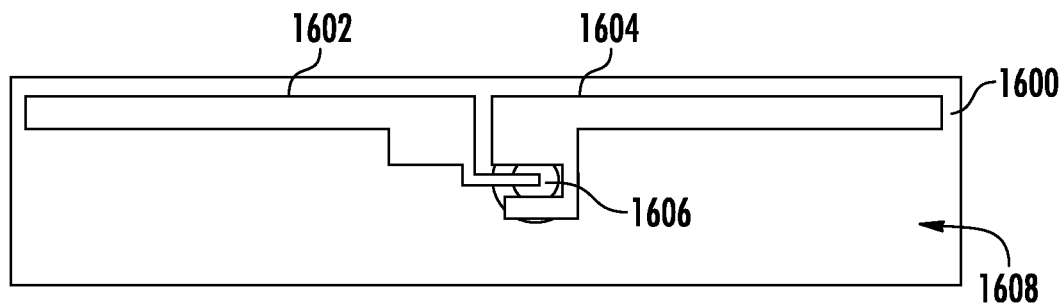
FIG. 16 is an alternate exemplary antenna that may be used as part of a wireless bridge.

FIG. 16 is another example of an antenna that may be used as part of the transparent wireless bridge disclosed herein. The antenna 1600 in FIG. 16 may be a dipole antenna with board mount coaxial feed, where a first antenna element 1602 and a second antenna element 1604 may be mounted via a mount 1606 on a board 1608.

Referring back to FIGS. 14A and 14B, the transparent wireless bridge disclosed therein may also provide a solution to provide power over the window 1400. This may be referred to as reverse powering. In many cases, power is available for the indoor unit (the second transceiver 1416), such as via a traditional wall outlet, but is not available for the outer unit (the first transceiver 1408). Traditional solutions include drilling a hole in the wall 1412 and feeding the first transceiver 1408 from inside the building by a cable, or feeding the first transceiver 1408 with an external cable (i.e., instead of fiber, composite cable with power and fiber may be used). Both of these solutions may have cost and logistics disadvantages.

Reverse powering over the window 1400 is possible using the antennas 1403, 1407 on the thin glass sheets 1402, 1404. This solution has several advantages as it requires minimum effort since is part of the transparent wireless bridge, does not require separate installation with drilling of holes in the walls, and is cheaper than composite cable.

There are three methods for wireless power transfer using the antennas 1403, 1407 on the thin glass sheets 1402, 1404. These three methods are: (1) radiative power transfer method; (2) inductive power transfer method; and (3) strongly resonant power transfer method.

In the radiative power transfer method, the individual electric and magnetic fields produced by the current on the conductive traces or areas of the antenna get coupled as an electromagnetic (EM) wave at a certain specific frequency or band of frequencies. The EM wave can radiate to very large distances (as an example, communication between geo-stationary satellite orbiting around earth and antenna on the earth's surface) based on the magnitude of the power transmitted, antenna gain, signal frequency, etc. In this method, the design and the impedance characteristics of the receive antenna, on account of the distance of separation, is not going to affect the performance of the transmit antenna, and thus the transmit and the receive antennas are uncoupled. The power coupled at the receive antenna due to the transmit antenna is a product of the power density at the receive antenna and the aperture of the receive antenna.

In the inductive power transfer method, the magnetic field of the transmit antenna, such as a loop transmit antenna couples with the receive antenna, such as a loop receive antenna, on account of the proximity between the transmit and the receive antenna, leading to a generation of voltage build-up, or power transferred at the receive antenna terminals. The impedance characteristic of both the transmit and the receive antenna are to be tuned with respect to each other for maximum power transfer, thus the antennas are strongly coupled. The amount of power transferred is proportional to the number of turns, distance of separation, series resistance of the antenna, etc.

In the strongly resonant power transfer method, the transmitter and the receiver are made to be at magnetic resonance with respect to each other, allowing for much efficient power transfer compared to the inductive power transfer method above. Since most of the common materials do not interact with magnetic fields, interactions with environmental objects are suppressed. Also, unlike the inductive power transfer method, this wireless powering method is more tolerant to the "scatter" of any dielectric or even metal bodies between the transmit antenna and the receive antenna. The term "scatter" refers to the general case scenario of the scattering of objects in a modern-day living room or a bedroom in a house.

Figure 17:
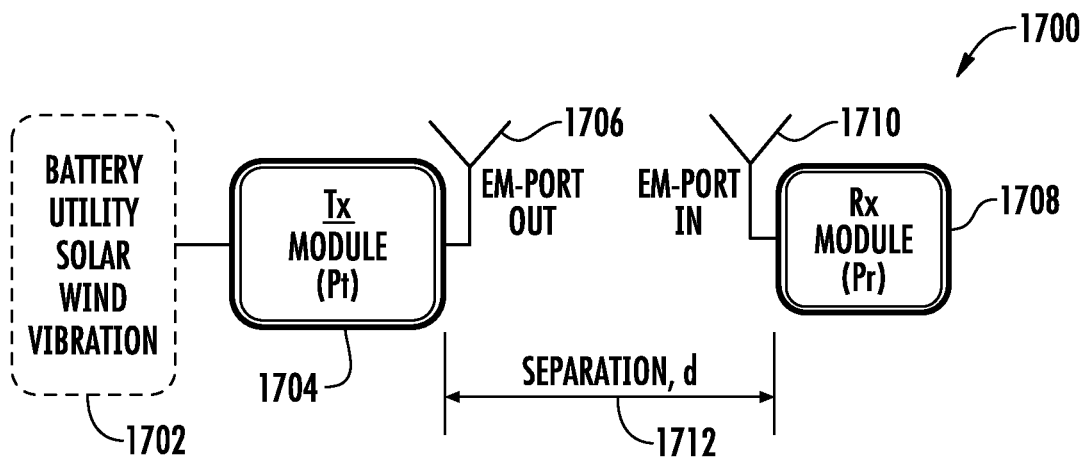
FIG. 17 is a general schematic for wireless powering using an exemplary wireless bridge.

FIG. 17 is a general schematic for wireless powering using the transparent wireless bridge disclosed herein. A reverse powering system 1700 includes a power source 1702 which is configured to provide power to a transmit module 1704 associated with an antenna 1706. The transmit module 1704 can be fed by any power source 1702, including but not limited to a battery, a power utility, solar power, wind power, vibration, or other energy harvest source. The transmit module 1704 is configured to provide power to a receive module 1708 associated with an antenna 1710. The transmit module 1704 is separated by a separation distance (d) 1712 from the receive module 1708. In one embodiment, the antennas on the thin glass sheets 1402, 1404 in FIGS. 14A and 14B may be used as the antennas 1706 and 1710, respectively. The amount of separation (d) 1712 depends on the window type.

Figure 18:
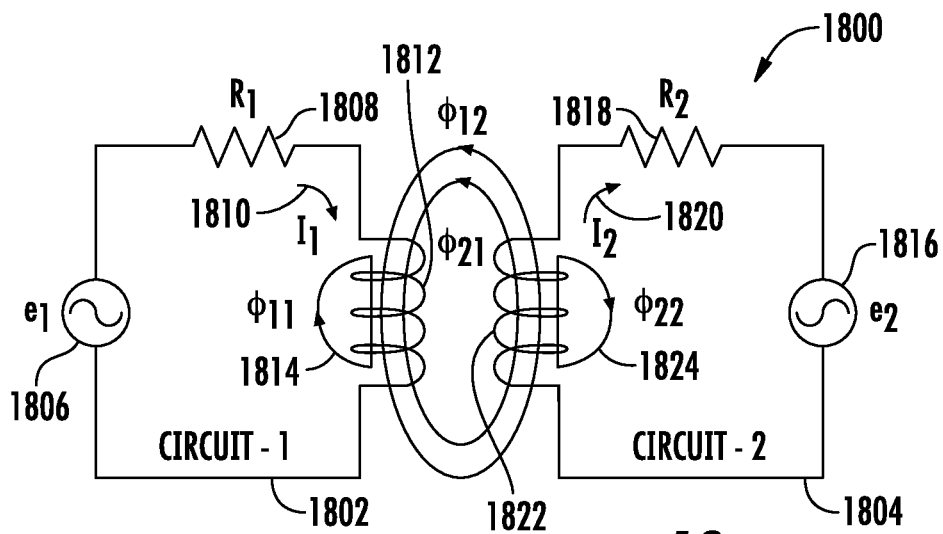
FIG. 18 shows exemplary circuitry for providing magnetic coupling between an exemplary transmit module and an exemplary receive module.

In order to build a magnetic coupling between the transmit module 1704 and the receive module 1708, an inductive element, such as a coil, needs to be implemented. FIG. 18 shows exemplary circuitry 1800 for providing a magnetic coupling between an exemplary transmit module and an exemplary receive module. The exemplary circuitry 1800 may comprise a first circuit 1802 and a second circuit 1804. The first circuit 1802 has a voltage source 1806 and a resistance 1808 for producing a current 1810 configured to be introduced to and inductive element 1812, such as a coil, to produce a magnetic field 1814. The second circuit 1804 has a voltage source 1816 and a resistance 1818 for producing a current 1820 configured to be introduced to an inductive element 1822, such as a coil, to produce a magnetic field 1824. Magnetic coupling will be built as a result of inductive elements 1812, 1822. In one embodiment, the inductive elements 1812 and 1822 may be coils, such as coils 1401, 1405 in FIG. 14A, and further may be implemented as a transparent element using the glass as substrate (i.e., Corning Willow Glass), similar to the antenna design. In one embodiment, a thin, mesh copper layer will keep it transparent (or semi-transparent).

Still referring to FIG. 18, the signal running through the inductive elements 1812, or 1822 may be an AC signal, and in one embodiment, may be a low frequency compared to the RF antenna. On the receiving side, a magnetic field around the Rx coil will generate an AC signal. This AC signal can be converted to a DC power.

Referring back to FIGS. 14A and 14B, the antennas 1403, 1407 on the thin glass sheets 1402, 1404 may be associated with inductive elements like inductive elements 1812, 1822 in FIG. 18, to provide reverse powering as described above to transceivers that might not otherwise have power. In another embodiment, a transformer may be provided on each of the thin glass sheets 1402 and 1404 in order to provide wireless powering over the window. The connections 1406 and 1414, which may be short composite cables in one embodiment, are connected between the antennas 1403, 1407 on the thin glass sheets 1402, 1404 and may be configured to provide power to the transmit/receive units (first and second transceivers 1408, 1416). The connections 1406, 1414 are configured to carry both communication signals (such as RF signals) and the power (AC or DC). A coaxial cable can carry both RF signals and DC (or low frequency AC). In addition, a multiplexer or combiner (not shown) can be implemented on the thin glass sheets 1402, 1404 as well to combine the RF antenna feed and the magnetic coil into one cable.

In addition, the transparent wireless bridge described above can be used in a wireless drop system (as an alternative to fiber drop). In this system, a wireless solution to project energy into a house, building, or MDU from a central location (i.e. lamp post, other buildings, etc.) may be implemented. In one non-limiting embodiment, a wireless transceiver may be attached to a central location (i.e. lamp post, other buildings etc.) and may be configured to transmit wirelessly to a device located on an outside surface of one or more buildings (such as houses, offices, or other dwellings), which is configured to project the energy inside the building to wireless transceiver(s) located within the building. In this system, the transparent wireless bridge described above can be used as part of the wireless drop.

Figure 19:
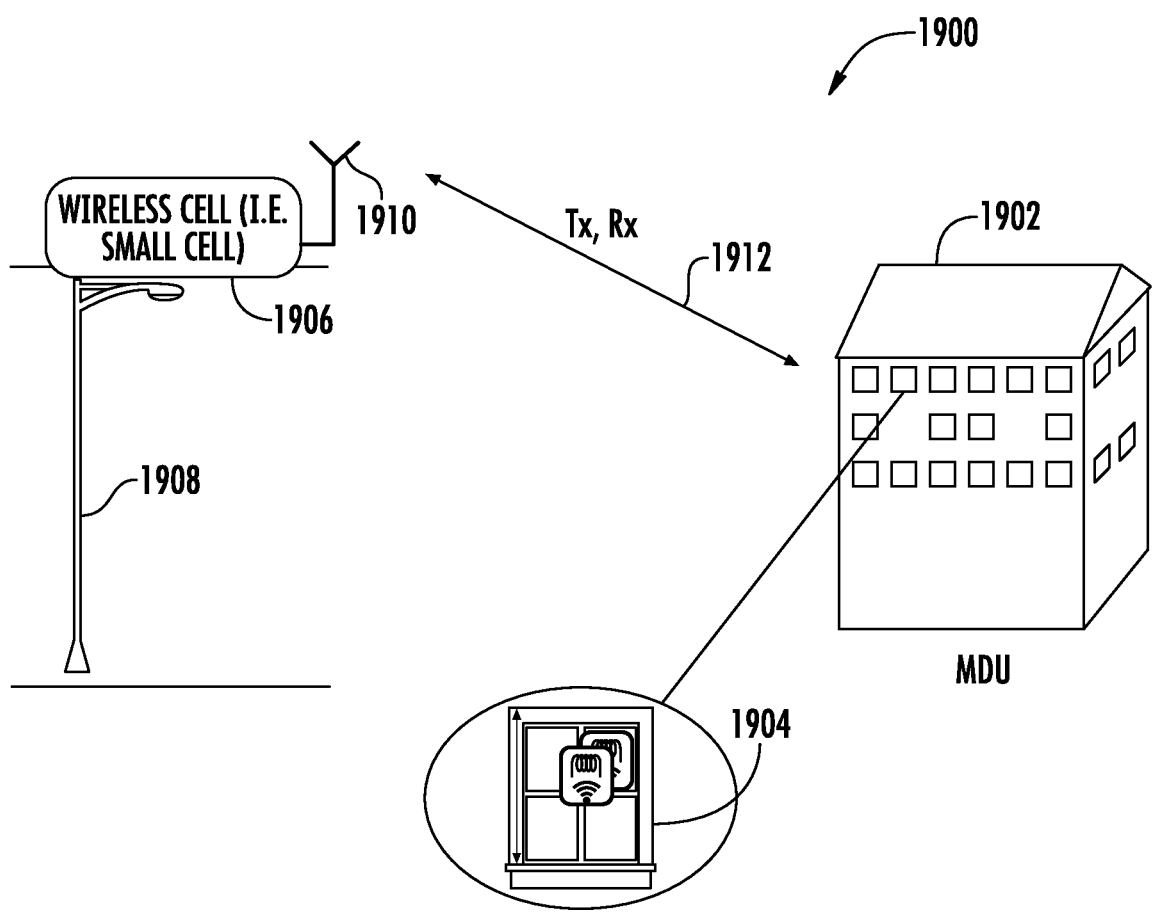
FIG. 19 illustrates a wireless transparent bridge being used in an exemplary wireless drop system.

FIG. 19 illustrates one example of a transparent wireless bridge described above being used in a wireless drop system 1900. A building 1902, such as a MDU, house, or office building, has a plurality of windows. One or more of the windows in the building 1902 may have a transparent wireless bridge 1904 similar to that shown in FIGS. 14A and 14B. A wireless drop cell 1906, such as a small cell or femtocell, may be positioned within wireless range of the building 1902. The wireless drop cell 1906 may also be referred to as a wireless drop terminal. The wireless drop cell or terminal 1906 may take any form or structure known for communicating wireless signals. In one embodiment, the wireless drop cell or terminal 1906 may comprise a fiber interface configured to optically couple the wireless drop cell or terminal 1906 to an optical line terminal of an optical fiber network via at least one optical fiber. The wireless drop cell or terminal 1906 may also comprise a wireless interface communicatively coupled to the fiber interface, the wireless interface being configured to wirelessly communicate with other wireless devices.

In one embodiment, the wireless drop cell 1906 may be attached to a structure 1908, such as a lamp post, light pole, or other building. The wireless drop cell 1906 has an antenna 1910 for communicating signals, such as RF signals. In this system, the wireless drop cell 1906 is within range of a network (not shown in FIG. 19), such as a fiber optic network, such that it may receive and transmit signals to and from the network. The wireless drop cell 1906 is also configured to project energy toward the building 1902 via the antenna 1910. The wireless drop cell 1906 is capable of both sending and receiving communication signals wirelessly via wireless link 1912. In one non-limiting embodiment, the wireless drop cell 1906 may include a wireless transceiver configured to transmit communication signals wirelessly via wireless link 1912 to a device located on an outside surface of the building 1902, such as a wireless transceiver like first transceiver 1408 in FIGS. 14A and 14B. In one embodiment, this may be the first transceiver 1408 in FIG. 14A. The signals transmitted by the wireless drop cell 1906 may then be transmitted inside the building 1902 to one or more wireless transceiver(s) located within the building 1902 using the transparent wireless bridge 1904 as described above. In this manner, the wireless transparent bridge described above and shown in FIGS. 14A and 14B can be used as part of the wireless drop system 1900.

Figure 20:
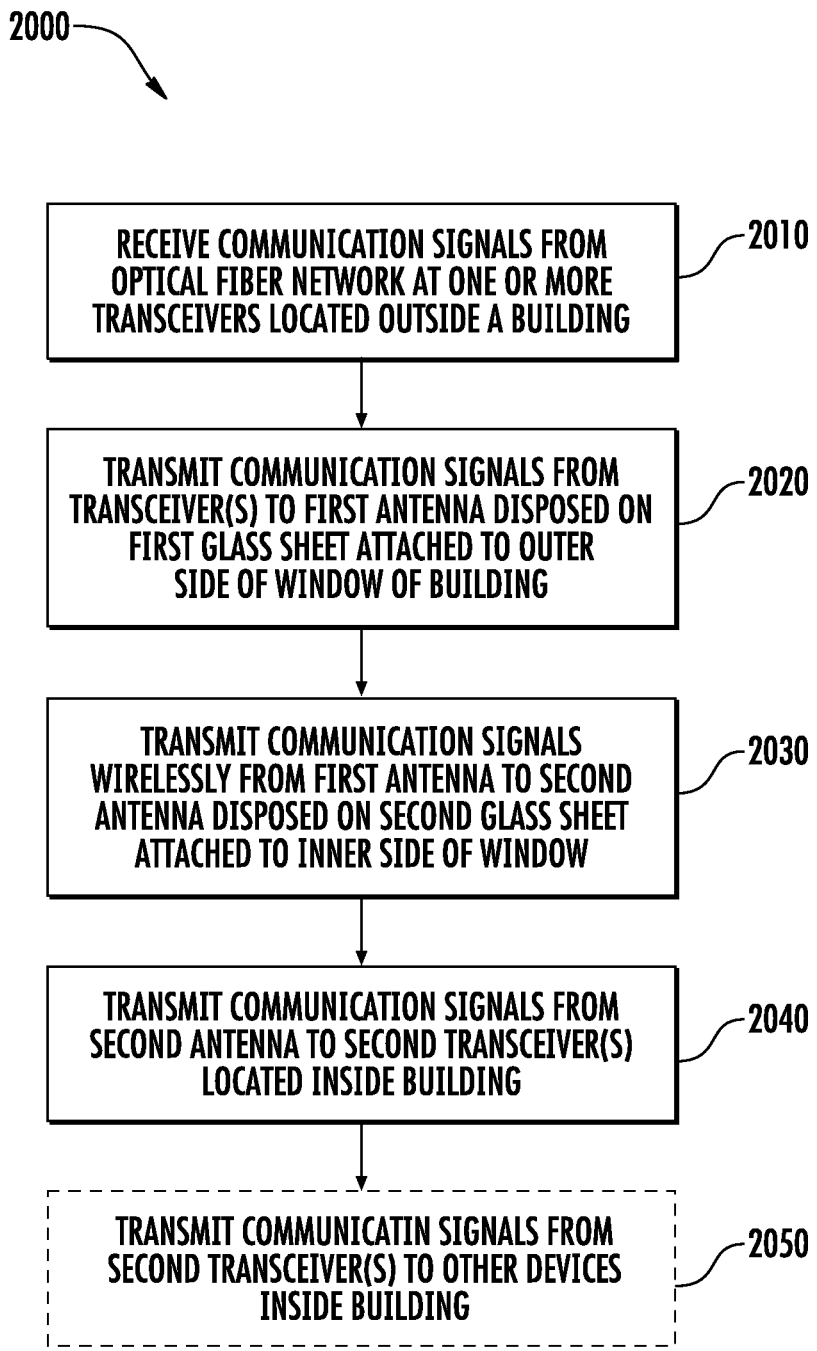
FIG. 20 is a flowchart of an exemplary method for providing access to an optical fiber network.

In another embodiment of the disclosure, a method for providing access to an optical fiber network is disclosed. FIG. 20 is a flowchart of an exemplary method for providing access to an optical fiber network. The wireless bridge as shown in FIGS. 14A and 14B can be used to perform the exemplary method of FIG. 20.

Referring to FIG. 20, a method 2000 comprises receiving communication signals from the optical fiber network at one or more first transceivers located outside a building (block 2010). In one embodiment, the one or more transceivers located outside the building may be like first transceiver 1408 in FIGS. 14A and 14B. The communication signals are transmitted from the one or more first transceivers to a first antenna disposed on a first glass sheet attached to an outer side of a window of the building and communicatively coupled to the at least one first transceiver (block 2020). In one embodiment, the first antenna disposed on a first glass sheet may be like the antenna 1403 on the first thin glass sheet 1402 in FIGS. 14A and 14B. The method also comprises transmitting the communication signals wirelessly from the first antenna to a second antenna disposed on a second glass sheet attached to an inner side of a window (block 2030). In one embodiment, the second antenna disposed on a second glass sheet may be like the antenna 1407 on the second thin glass sheet 1404 in FIGS. 14A and 14B. The communication signals are then transmitted from the second antenna to at least one second transceiver located inside the building, the at least one second transceiver being communicatively coupled to the second antenna (block 2040). In one embodiment, the at least one transceiver located inside the building may be like second transceiver 1416 in FIGS. 14A and 14B. In this manner, the at least one second transceiver located inside the building is configured to receive communication signals to and from the at least one first transceiver located outside the building via the first antenna and the second antenna such that the at least one second transceiver has access to the optical fiber network. In an optional step, the method further comprises the at least one second transceiver located inside the building transmitting the communication signals to other devices inside the building, either wirelessly or via a wired connection (block 2050).

Figure 21:
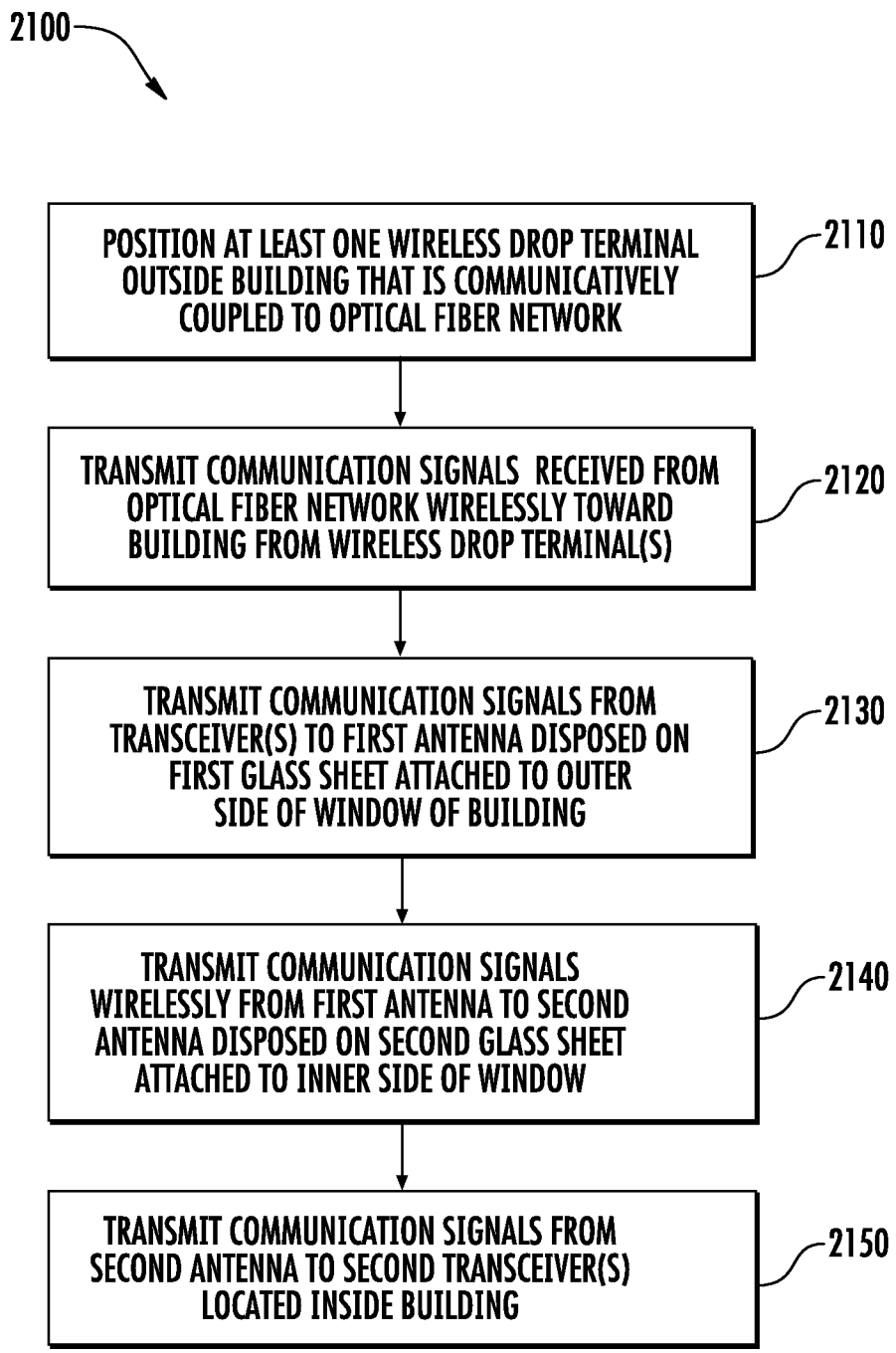
FIG. 21 is a flowchart of an exemplary method for providing a wireless drop system.

Another embodiment of the disclosure relates to a method of providing a wireless drop system. FIG. 21 is a flowchart of an exemplary method 2100 for providing a wireless drop system. In one embodiment, the method 2100 may be carried out by the wireless drop system 1900 shown in FIG. 19.

The method comprises positioning at least one wireless drop terminal outside a building, the at least one wireless drop terminal communicatively coupled to an optical fiber network (block 2110). In one embodiment, the least one wireless drop terminal may be like wireless drop cell 1906 in FIG. 19. Communication signals received from the optical fiber network are transmitted wirelessly toward a building from the at least one wireless drop terminal (block 2120), where the communication signals are received by one or more first transceivers located outside the building, such as attached to an outside wall of the building. In one embodiment, the one or more transceivers located outside the building may be like first transceiver 1408 in FIGS. 14A and 14B. The method further comprises transmitting the communication signals from the one or more first transceivers to a first antenna disposed on a first glass sheet attached to an outer side of a window of the building and communicatively coupled to the at least one first transceiver (block 2130). In one embodiment, the first antenna disposed on a first glass sheet may be like the antenna on the first thin glass sheet 1402 in FIGS. 14A and 14B. The communication signals are transmitted wirelessly from the first antenna to a second antenna disposed on a second glass sheet attached to an inner side of a window (block 2140). In one embodiment, the second antenna disposed on a second glass sheet may be like the antenna on the first thin glass sheet 1402 in FIGS. 14A and 14B. The method further comprises transmitting the communication signals from the second antenna to at least one second transceiver located inside the building, the at least one second transceiver being communicatively coupled to the second antenna (block 2150). In one embodiment, the at least one second transceiver located inside the building may be like second transceiver 1416 in FIGS. 14A and 14B. In this manner, the at least one second transceiver located inside the building is configured to receive communication signals to and from the at least one first transceiver located outside the building via the first antenna and the second antenna such that the at least one second transceiver has access to the optical fiber network via the wireless drop terminal, such as wireless drop cell 1906 in FIG. 19.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless bridge for providing access to an optical fiber network comprising:
    at least one first transceiver located outside a building and configured to transmit and receive communication signals to and from the optical fiber network;
    a first glass sheet attached to an outer side of a window of the building, the first glass sheet comprising a first antenna disposed on the first glass sheet, the first antenna comprising a first inductive element and being communicatively coupled to the at least one first transceiver and configured to transmit and receive communication signals to and from the at least one first transceiver;
    a second glass sheet attached to an inner side of the window of the building, the second glass sheet comprising a second antenna disposed on the second glass sheet, the second antenna comprising a second inductive element and being configured to wirelessly transmit and receive communication signals to and from the first antenna disposed in the first glass sheet; and
    at least one second transceiver located inside the building, the at least one second transceiver being communicatively coupled to the second antenna and configured to wirelessly transmit and receive data to and from the second antenna;
    wherein the at least one second transceiver is connected to a power source located inside the building and is configured to provide power from the power source to the second antenna;
    wherein the first inductive element and the second inductive element are arranged to induce magnetic coupling between the first inductive element and the second inductive element, such that a magnetic field around the first inductive element generates a power signal which can be provided to the at least one first transceiver from the first antenna via a cable connecting the first antenna and the at least one first transceiver; and
    wherein the at least one second transceiver located inside the building is configured to transmit and receive communication signals to and from the at least one first transceiver located outside the building via the first antenna and the second antenna such that the at least one second transceiver has access to the optical fiber network.

2. The wireless bridge of claim 1, wherein the at least one first transceiver is coupled to the optical fiber network via fiber.

3. The wireless bridge of claim 1, wherein the at least one first transceiver is configured to transmit and receive communication signals to and from the optical fiber network wirelessly.

4. The wireless bridge of claim 1, wherein at least one of the first antenna and the second antenna is a printed antenna.

5. The wireless bridge of claim 1, wherein at least one of the first antenna and the second antenna is transparent such that a view through the window is not obstructed.

6. The wireless bridge of claim 1, wherein the first antenna is coupled to the at least one first transceiver via a first cable and the at least one first transceiver is configured to provide power to the first antenna through the first cable.

7. The wireless bridge of claim 1, wherein the second antenna is coupled to the at least one second transceiver via a second cable and the at least one second transceiver is configured to provide power to the second antenna through the second cable.

8. A passive optical network (PON) system comprising:
    an optical line termination (OLT) of a PON located outside a building;
    an optical network terminal (ONT) of a PON located inside the building; and
    a wireless bridge disposed between the OLT and the ONT, the wireless bridge comprising:
        at least one first transceiver located outside a building and configured to transmit and receive communication signals to and from an optical fiber network;
        a first glass sheet attached to an outer side of a window of the building, the first glass sheet comprising a first antenna disposed on the first glass sheet, the first antenna comprising a first inductive element and being communicatively coupled to the at least one first transceiver and configured to transmit and receive communication signals to and from the at least one first transceiver;
        a second glass sheet attached to an inner side of the window of the building, the second glass sheet comprising a second antenna disposed on the second glass sheet, the second antenna comprising a second inductive element and being configured to wirelessly transmit and receive communication signals to and from the first antenna disposed in the first glass sheet; and
        at least one second transceiver located inside the building, the at least one second transceiver being communicatively coupled to the second antenna and configured to wirelessly transmit and receive data to and from the second antenna;
        wherein the at least one second transceiver is connected to a power source located inside the building and is configured to provide power from the power source to the second antenna; and
        wherein the first inductive element and the second inductive element are arranged to induce magnetic coupling between the first inductive element and the second inductive element, such that a magnetic field around the first inductive element generates a power signal which can be provided to the at least one first transceiver from the first antenna via a cable connecting the first antenna and the at least one first transceiver.

9. The PON system of claim 8, wherein the first antenna is coupled to the at least one first transceiver via a first cable and the at least one first transceiver is configured to provide power to the first antenna through the first cable.

10. The PON system of claim 8, wherein the second antenna is coupled to the at least one second transceiver via a second cable and the at least one second transceiver is configured to provide power to the second antenna through the second cable.

11. A wireless drop system comprising:
- at least one wireless drop terminal located outside a building and communicatively coupled to an optical fiber network, the at least one wireless drop terminal being configured to transmit communication signals received from the optical fiber network wirelessly toward the building;
- at least one first transceiver located outside the building and configured to transmit and receive communication signals wirelessly to and from the at least one wireless drop terminal;
- a first glass sheet attached to an outer side of a window of the building, the first glass sheet comprising a first antenna disposed on the first glass sheet, the first antenna comprising a first inductive element and being communicatively coupled to the at least one first transceiver and configured to transmit and receive communication signals to and from the at least one first transceiver;
- a second glass sheet attached to an inner side of the window of the building, the second glass sheet comprising a second antenna disposed on the second glass sheet, the second antenna comprising a second inductive element and being configured to wirelessly transmit and receive communication signals to and from the first antenna disposed in the first glass sheet; and
- at least one second transceiver located inside the building, the at least one second transceiver being communicatively coupled to the second antenna and configured to wirelessly transmit and receive data to and from the second antenna;
- wherein the at least one second transceiver located inside the building is configured to transmit and receive communication signals to and from the at least one first transceiver located outside the building via the first antenna and the second antenna such that the at least one second transceiver has access to the optical fiber network through the at least one wireless drop terminal;
- wherein the at least one second transceiver is connected to a power source located inside the building and is configured to provide power from the power source to the second antenna; and
- wherein the first inductive element and the second inductive element are arranged to induce magnetic coupling between the first inductive element and the second inductive element, such that a magnetic field around the first inductive element generates a power signal which can be provided to the at least one first transceiver from the first antenna via a cable connecting the first antenna and the at least one first transceiver.

12. The wireless drop system of claim 11, wherein the at least one wireless drop terminal is located on a structure selected from the group of lamp post, light pole, and another building.

13. The wireless drop system of claim 11, wherein the first antenna is coupled to the at least one first transceiver via a first cable and the at least one first transceiver is configured to provide power to the first antenna through the first cable.

14. The wireless drop system of claim 11, wherein the second antenna is coupled to the at least one second transceiver via a second cable and the at least one second transceiver is configured to provide power to the second antenna through the second cable.

\* \* \* \* \*